(12) United States Patent
Takenaka et al.

(10) Patent No.: US 10,384,713 B2
(45) Date of Patent: Aug. 20, 2019

(54) WORK VEHICLE AND METHOD FOR CONTROLLING WORK VEHICLE

(71) Applicant: KOMATSU LTD., Tokyo (JP)

(72) Inventors: Yuita Takenaka, Tokyo (JP);
Masanobu Nakabayashi, Tokyo (JP);
Masanori Ikari, Tokyo (JP)

(73) Assignee: KOMATSU LTD., Tokyo (JP)

( * ) Notice: Subject to any disclaimer, the term of this patent is extended or adjusted under 35 U.S.C. 154(b) by 203 days.

(21) Appl. No.: 15/556,402

(22) PCT Filed: Oct. 26, 2016

(86) PCT No.: PCT/JP2016/081734
§ 371 (c)(1),
(2) Date: Sep. 7, 2017

(87) PCT Pub. No.: WO2017/073616
PCT Pub. Date: May 4, 2017

(65) Prior Publication Data
US 2018/0105203 A1    Apr. 19, 2018

(30) Foreign Application Priority Data
Oct. 30, 2015 (JP) .................................. 2015-213869

(51) Int. Cl.
*B62D 5/065* (2006.01)
*B62D 5/083* (2006.01)
(Continued)

(52) U.S. Cl.
CPC .............. *B62D 5/065* (2013.01); *B62D 1/12* (2013.01); *B62D 5/006* (2013.01); *B62D 5/0463* (2013.01);
(Continued)

(58) Field of Classification Search
CPC ........... B62D 12/00; B62D 5/09; B62D 5/065
See application file for complete search history.

(56) References Cited

U.S. PATENT DOCUMENTS

| 6,179,082 B1 | 1/2001 | Ikari |
| 6,202,501 B1 | 3/2001 | Ikari |

(Continued)

FOREIGN PATENT DOCUMENTS

| CN | 101772447 A | 7/2010 |
| CN | 102015417 A | 4/2011 |

(Continued)

OTHER PUBLICATIONS

The Office Action for the corresponding Chinese application No. 201680013269.0, dated Jan. 16, 2019.
(Continued)

*Primary Examiner* — Kevin Hurley
*Assistant Examiner* — Michael R Stabley
(74) *Attorney, Agent, or Firm* — Global IP Counselors, LLP

(57) ABSTRACT

An articulated work vehicle with linked front and rear frames includes a joystick lever, a force imparting component, and a controller. The joystick lever can be moved to an inside or an outside with respect to an operator's seat by being operated by an operator, to change a steering angle of the front frame with respect to the rear frame. The force imparting component is configured to impart an assist force or a counterforce to an operation of the joystick lever by the operator. The controller controls the force imparting component so that an operating force required to move the joystick lever to the outside is different from an operating force required to move the joystick lever to the inside.

12 Claims, 16 Drawing Sheets

(51) Int. Cl.
  *B62D 5/087* (2006.01)
  *B62D 5/10* (2006.01)
  *B62D 5/28* (2006.01)
  *B62D 5/04* (2006.01)
  *B62D 5/09* (2006.01)
  *B62D 5/00* (2006.01)
  *B62D 6/00* (2006.01)
  *B62D 12/00* (2006.01)
  *B62D 1/12* (2006.01)
  *B62D 3/04* (2006.01)
  *B62D 3/14* (2006.01)

(52) U.S. Cl.
  CPC ............. *B62D 5/083* (2013.01); *B62D 5/087* (2013.01); *B62D 5/0832* (2013.01); *B62D 5/09* (2013.01); *B62D 5/091* (2013.01); *B62D 5/10* (2013.01); *B62D 5/28* (2013.01); *B62D 6/008* (2013.01); *B62D 12/00* (2013.01); *B62D 3/04* (2013.01); *B62D 3/14* (2013.01)

(56) References Cited

U.S. PATENT DOCUMENTS

| | | | | |
|---|---|---|---|---|
| 7,610,989 B2* | 11/2009 | Vigholm | ................. | B62D 1/22 180/418 |
| 9,809,263 B2* | 11/2017 | Mitchell | ............. | B62D 51/008 |
| 2008/0041655 A1* | 2/2008 | Breiner | ................. | B62D 12/00 180/418 |
| 2008/0162000 A1* | 7/2008 | Dattilo | ................... | B62D 6/008 701/42 |
| 2008/0315559 A1* | 12/2008 | Murakami | ............ | A01B 67/00 280/446.1 |
| 2010/0108431 A1 | 5/2010 | Makuta et al. | | |
| 2010/0307857 A1* | 12/2010 | Shinagawa | .............. | B62D 5/06 180/421 |
| 2011/0029199 A1 | 2/2011 | Saito et al. | | |
| 2012/0217083 A1* | 8/2012 | Brickner | ................ | B62D 5/001 180/417 |
| 2013/0068544 A1 | 3/2013 | Itou et al. | | |
| 2015/0105980 A1 | 4/2015 | Iwao | | |
| 2015/0203153 A1 | 7/2015 | Togashi et al. | | |
| 2015/0210310 A1* | 7/2015 | Akatsuka | ................. | B62D 5/04 701/41 |
| 2016/0319848 A1* | 11/2016 | Tanaka | .................. | F15B 11/162 |

FOREIGN PATENT DOCUMENTS

| | | |
|---|---|---|
| CN | 102917942 A | 2/2013 |
| CN | 104204365 A | 12/2014 |
| CN | 104302536 A | 1/2015 |
| CN | 104602988 A | 5/2015 |
| JP | 54-90726 A | 7/1979 |
| JP | 8-115140 A | 5/1996 |
| JP | 11-105723 A | 4/1999 |
| JP | 11-321664 A | 11/1999 |
| JP | 2000-313350 A | 11/2000 |
| JP | 2002-160652 A | 6/2002 |
| JP | 2002-160660 A | 6/2002 |
| JP | 2003-95116 A | 4/2003 |
| JP | 2005-306184 A | 11/2005 |
| JP | 2015-113039 A | 12/2015 |
| RU | 2 049 694 C1 | 12/1995 |

OTHER PUBLICATIONS

The International Search Report for the corresponding international application No. PCT/JP2016/081734, dated Jan. 24, 2017.

* cited by examiner

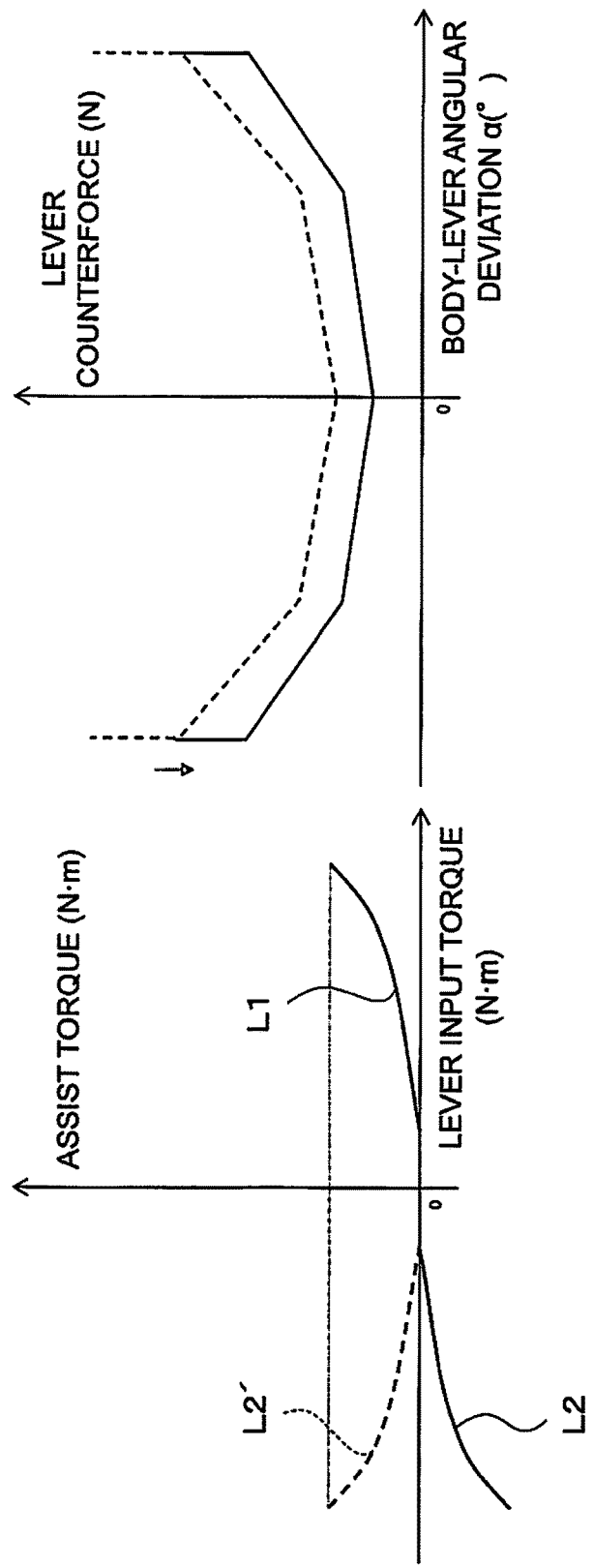

WORK VEHICLE AND METHOD FOR CONTROLLING WORK VEHICLE

CROSS-REFERENCE TO RELATED APPLICATIONS

This application is a U.S. National stage application of International Application No. PCT/JP2016/081734, filed on Oct. 26, 2016. This U.S. National stage application claims priority under 35 U.S.C. § 119(a) to Japanese Patent Application No. 2015-213869, filed in Japan on Oct. 30, 2015, the entire contents of which are hereby incorporated herein by reference.

BACKGROUND

Field of the Invention

The present invention relates to a work vehicle and to a method for controlling a work vehicle.

Description of the Related Art

An articulated work vehicle has been disclosed with a configuration in which the steering angle is changed by controlling the flow of fluid supplied to a hydraulic actuator disposed from the front frame to the rear frame (see Japanese Laid-Open Patent Application H11-105723 and Japanese Laid-Open Patent Application H11-321664, for example).

With the work vehicles in Japanese Laid-Open Patent Application H11-105723 and Japanese Laid-Open Patent Application H11-321664, when the operator moves the joystick lever, the port of a pilot valve is either opened or closed, and the pilot pressure is changed. The flow of fluid supplied from a steering valve to the hydraulic actuator is adjusted according to the changed pilot pressure, which changes the steering angle of the work vehicle.

As disclosed in Japanese Laid-Open Patent Application H11-321664, the joystick lever is generally disposed next to the operator's seat, and when the operator moves the joystick lever to the right side, the front frame rotates to the right with respect to the rear frame, and when the operator moves the joystick lever to the left side, the front frame rotates to the left with respect to the rear frame.

SUMMARY

With a conventional work vehicle, however, the tactile sensation when moving the wrist to the inside was different from the tactile sensation when moving the wrist to the outside in operating the joystick lever.

In light of the above problem encountered in the past, it is an object of the present invention to provide a work vehicle and a method for controlling a work vehicle with which the operator has improved tactile sensation.

The work vehicle pertaining to the first aspect is an articulated work vehicle in which a front frame and a rear frame are linked, comprising a joystick lever, a force imparting component, and a controller. The joystick lever is moved to the inside or outside with respect to an operator's seat by being operated by an operator, to change the steering angle of the front frame with respect to the rear frame. The force imparting component imparts an assist force or a counterforce to the operation of the joystick lever by the operator. The controller controls the force imparting component so that the operating force required to move the joystick lever to the outside is different from the operating force required to move the joystick lever to the inside.

Thus imparting a force so that the force required to move the joystick lever to the outside is different from the force required to move the joystick lever to the inside allows the tactile sensation when the wrist is moved to the outside to be set to a tactile sensation that is about the same as that when the wrist is moved to the inside, so the tactile sensation of the operator can be improved.

The work vehicle pertaining to the second aspect is the work vehicle pertaining to the first aspect, wherein the controller controls the force imparting component so that the operating force required to move the joystick lever to the outside is less than the operating force required to move the joystick lever to the inside.

In general, it is harder to move a joystick lever to the outside with respect to the operator's seat than to move it to the inside. Accordingly, if a force is thus imparted so that the force required to move the joystick lever to the outside is less than the operating force required to move the joystick lever to the inside, the tactile sensation when the wrist is moved to the outside can be set to a tactile sensation that is about the same as that when the wrist is moved to the inside. This improves the tactile sensation of the operator.

Also, even when the joystick lever is moved to the outside, the joystick lever can be moved with a lighter force.

The work vehicle pertaining to the third aspect is the work vehicle pertaining to the first aspect, further comprising a torque sensor. The torque sensor senses the torque produced by operation of the joystick lever. The controller controls the force imparting component so that an assist force or a counterforce is imparted to the operation of the joystick lever according to the torque sensed by the torque sensor.

As a result, a force can be imparted according to the torque applied by the operator to the joystick lever. For example, the imparted force can be controlled so that the assist force imparted by the force imparting component is increased when the torque applied to the joystick lever by the operator is high, and the assist force is reduced when the torque is low.

The work vehicle pertaining to the fourth aspect is the work vehicle pertaining to the second aspect, wherein the torque sensor senses whether movement of the joystick lever is to the inside or the outside. The controller controls the force imparting component so that the force imparted to operation of the joystick lever is varied on the basis of the movement direction of the joystick lever, according to the torque sensed by the torque sensor.

Consequently, the controller determines whether the joystick lever is being operated to the inside or the outside with respect to the operator's seat, and can control the force imparting component so that the operating force required to move the joystick lever to the outside is lower than the operating force required to move the joystick lever to the inside.

The work vehicle pertaining to the fifth aspect is the work vehicle pertaining to the first aspect, further comprising a target steering angle sensor and an actual steering angle sensor. The joystick lever is able to rotate to the inside or the outside with respect to the operator's seat, and the rotational angle of the joystick lever corresponds to the target steering angle of the front frame with respect to the rear frame. The target steering angle sensor senses the target steering angle. The actual steering angle sensor senses the actual steering angle. The controller determines whether movement of the joystick lever is to the inside or the outside on the basis of the difference between the target steering angle and the actual steering angle.

Consequently, the controller determines whether movement of the joystick lever is to the inside or the outside with respect to the operator's seat, and can control the force imparting component so that the operating force required to move the joystick lever to the outside is lower than the operating force required to move the joystick lever to the inside.

The work vehicle pertaining to the sixth aspect is the work vehicle pertaining to the first aspect, further comprising a speed sensor. The speed sensor senses the speed of the work vehicle. The controller controls the force imparting component so as to impart the assist force or the counterforce according to the speed sensed by the speed sensor.

Consequently, when the work vehicle is moved at low speed, for example, operability can be improved by imparting an assist force to the joystick lever to reduce the force required to operate the joystick lever. On the other hand, when the travel speed of the work vehicle is changed from a low speed to a high speed, travel stability can be improved by imparting a counterforce to the joystick lever or decreasing the assist force to increase the force needed to operate the joystick lever.

The work vehicle pertaining to the seventh aspect is the work vehicle pertaining to the sixth aspect, wherein the controller controls the force imparting component so that when the speed sensed by the speed sensor is higher than a specific preset speed, a counterforce is imparted to at least movement of the joystick lever to the inside, and when the speed sensed by the speed sensor is equal to or lower than the specific preset speed, an assist force is imparted.

When the joystick lever is moved in the inside direction of the operator's seat, the operator can easily apply force. Therefore, if the joystick lever is moved in the inside direction of the operator's seat while the work vehicle is moving at a high speed, the joystick lever can be made harder to move by imparting a counterforce to its operation, and this improves travel stability at high speed.

The work vehicle pertaining to the eighth aspect is the work vehicle pertaining to the first aspect, wherein the controller controls the force imparting component so that when an assist force is imparted to movement of the joystick lever both to the inside and to the outside, the assist force when the joystick lever is moved to the outside is greater than the assist force when the joystick lever is moved to the inside.

By thus making the assist force when moving the joystick lever to the outside be higher than the assist force when moving the joystick lever to the inside, the operating force required to move the joystick lever to the outside can be lower than the operating force required to move the joystick lever to the inside.

The work vehicle pertaining to the ninth aspect is the work vehicle pertaining to the first aspect, comprising a hydraulic actuator and a control valve. The hydraulic actuator changes the steering angle. The control valve is linked to the joystick lever and controls the flow of fluid supplied to the hydraulic actuator. The control valve has a first input member, a second input member, and a biasing component. The first input member is linked to the joystick lever and is displaced according to the amount of operation of the joystick lever. The second input member is displaced according to the steering angle. The biasing component biases the first input member to a neutral position at which the amount of displacement of the first input member matches the amount of displacement of the second input member. The controller controls the flow of fluid supplied to the hydraulic actuator according to the difference between the amount of displacement of the second input member and the amount of displacement of the first input member. The joystick lever is operated against the biasing force of the biasing component.

Consequently, after the joystick lever has been operated, the steering angle is changed to follow the joystick lever, and the control valve goes into the neutral position when the steering angle matches the amount of operation of the joystick lever.

Also, the biasing component is thus provided to the control valve, and the operator operates the joystick lever with an operating force that goes against the biasing force produced by the biasing component. An assist force or counterforce can be imparted to the operation against this biasing force.

The work vehicle pertaining to the tenth aspect is the work vehicle pertaining to the ninth aspect, further comprising a steering valve. The steering valve adjusts the flow of fluid supplied to the hydraulic actuator on the basis of a pilot pressure inputted from the control valve. The control valve controls the flow of fluid supplied from the steering valve to the hydraulic actuator by adjusting the pilot pressure.

Consequently, the pilot pressure is adjusted by operator operation, the amount of fluid supplied from the steering valve to the hydraulic actuator is controlled, and the steering angle of the front frame with respect to the rear frame is changed.

The work vehicle pertaining to the eleventh aspect is the work vehicle pertaining to the first aspect, further comprising a hydraulic actuator, a control valve, and a link. The hydraulic actuator changes the steering angle. The control valve is linked to the joystick lever and controls the flow of fluid supplied to the hydraulic actuator. The link links the joystick lever to the control valve. The force imparting component has an electric motor and a transmission mechanism. The electric motor generates the assist force or the counterforce. The transmission mechanism transmits the assist force or the counterforce produced by the electric motor to the link.

Consequently, the force of the electric motor can be transmitted to the link that links the joystick lever to the control valve, and the force required to operate the joystick lever can be changed.

The method for controlling a work vehicle pertaining to the twelfth aspect is a method for controlling an articulated work vehicle in which a front frame and a rear frame are linked, said method comprising an operation direction sensing step and a force imparting step. The operation direction sensing step involves sensing the rotation direction of a joystick lever that is able to rotate to the inside or the outside with respect to an operator's seat. The force imparting step involves imparting an assist force or a counterforce to the operation of the joystick lever by the operator so that the operating force required when the joystick lever is moved to the outside will be different from the operating force required when the joystick lever is moved to the inside.

Thus imparting a force so that the operating force required to move the joystick lever to the outside will be different from the operating force required to move the joystick lever to the inside allows the tactile sensation when the wrist is moved to the outside to be set to a tactile sensation that is about the same as that when the wrist is moved to the inside, so the tactile sensation of the operator can be improved.

Effects of the Invention

The present invention provides a work vehicle and a method for controlling a work vehicle with which the tactile sensation of an operator can be improved.

BRIEF DESCRIPTION OF DRAWINGS

FIG. 9A is a graph of the relation between assist torque and lever input torque when the forces applied in left and right operations are equal, and FIG. 9B is a graph of the relation between lever counterforce and body-lever angular deviation when the assist torque shown in FIG. 9A is and is not imparted;

DETAILED DESCRIPTION OF EMBODIMENT(S)

A wheel loader in an embodiment pertaining to the present invention will now be described through reference to the drawings.

Embodiment 1

1. Configuration
1-1. Overview of Wheel Loader Configuration

Figure 1:
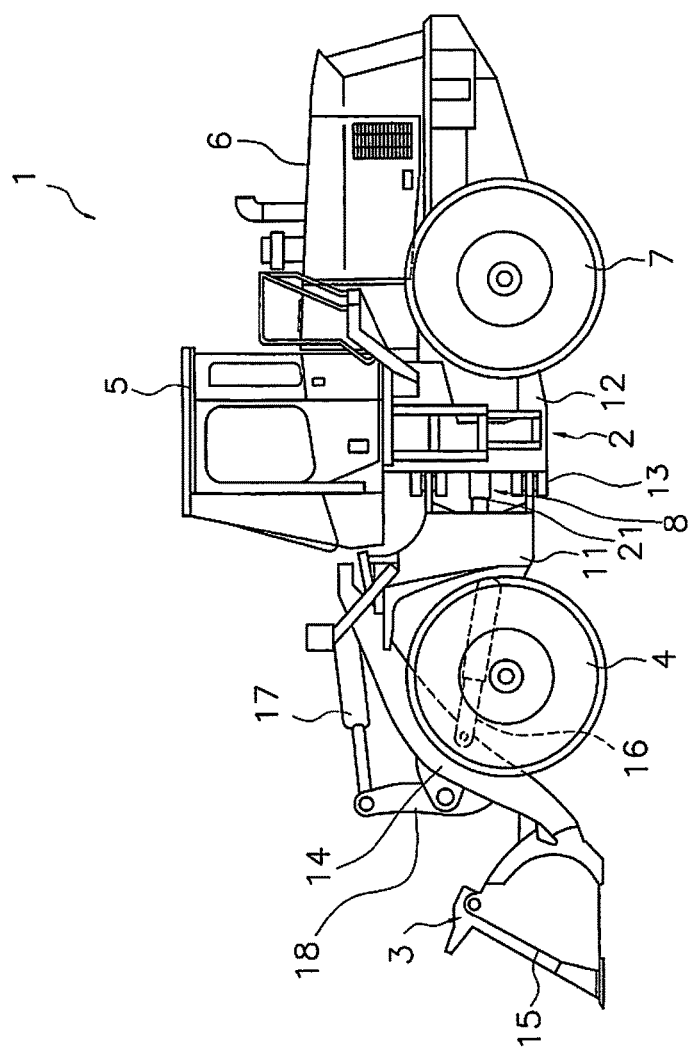
FIG. 1 is a side view of a wheel loader in an embodiment pertaining to the present invention.

FIG. 1 is a simplified diagram of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operating device 8 (see FIG. 2, discussed below).

The wheel loader 1 performs earth loading and other such work with the work implement 3.

The body frame 2 is what is known as an articulated type, and has a front frame 11, a rear frame 12, and a linking shaft 13. The front frame 11 is disposed in front of the rear frame 12. The linking shaft 13 is provided in the center of the vehicle width direction, and pivotably links the front frame 11 to the rear frame 12. The front tires 4 are attached on the left and right sides of the front frame 11. The rear tires 7 are attached on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The lift cylinder 16 telescopes in and out to pivot the boom 14 up and down. One end of the bucket cylinder 17 is attached to the front frame 11, and the other end of the bucket cylinder 17 is attached to the bucket 15 via a bell crank 18. The bucket cylinder 17 telescopes in and out to pivot the bucket 15 up and down.

The cab 5 is mounted on the rear frame 12, inside of which are disposed a steering wheel or joystick lever 24 (discussed below; see FIG. 2) for steering, a lever for controlling the work implement 3, various display devices, and so forth. The engine compartment 6 is disposed on the rear frame 12 to the rear of the cab 5, and houses an engine.

The steering operating device 8 will be discussed in detail below, but has steering cylinders 21 and 22. The amount of fluid supplied to the steering cylinders 21 and 22 is varied to change the steering angle of the front frame 11 with respect to the rear frame 12 and to change the travel direction of the wheel loader 1.

1-2. Steering Operation Device

Figure 2:
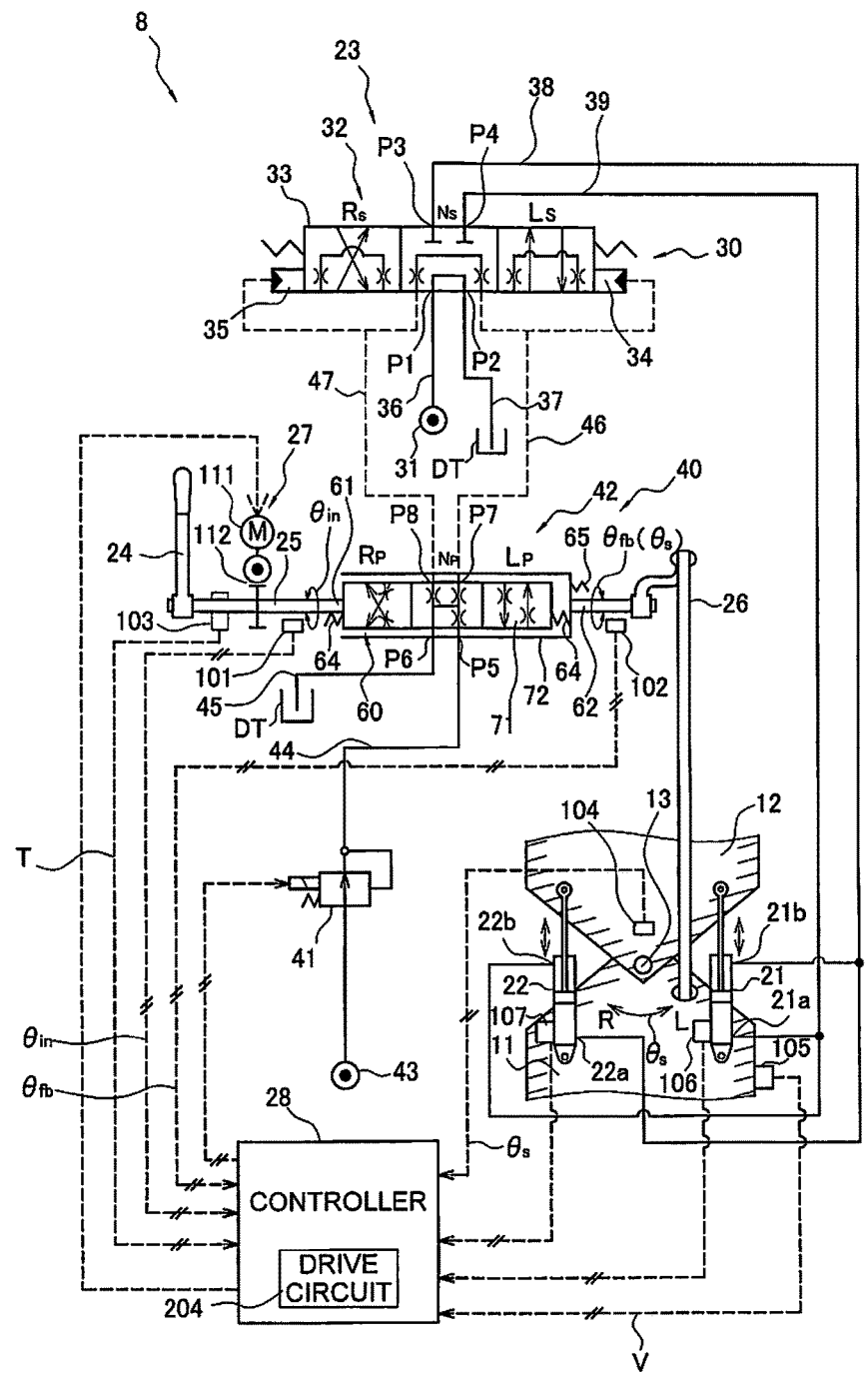
FIG. 2 is a hydraulic circuit diagram showing the configuration of a steering operation device of the wheel loader in FIG. 1.

FIG. 2 is a hydraulic circuit diagram of the configuration of the steering operation device 8. The steering operation device 8 in this embodiment mainly has a pair of steering cylinders 21 and 22, a steering hydraulic circuit 23, a joystick lever 24, a link 25, a linking mechanism 26, a force imparting component 27, and a controller 28.

1-2-1. Steering Cylinders

The steering cylinders 21 and 22 are driven hydraulically. The steering cylinders 21 and 22 are disposed side by side on the left and right sides in the vehicle width direction, flanking a linking shaft 13. The steering cylinder 21 is disposed on the left side of the linking shaft 13 (see FIG. 1). The steering cylinder 22 is disposed on the right side of the linking shaft 13. The steering cylinders 21 and 22 are attached at one end to the front frame 11, and at the other end to the rear frame 12.

The steering cylinder 21 is provided with an extension port 21a and a contraction port 21b, and the steering cylinder 22 is provided with an extension port 22a and a contraction port 22b.

When fluid is supplied to the extension port 21a of the steering cylinder 21 and the contraction port 22b of the steering cylinder 22 and fluid is discharged from the contraction port 21b of the steering cylinder 21 and the extension port 22a of the steering cylinder 22, the steering cylinder 21 extends and the steering cylinder 22 contracts. As a result, the steering angle θs changes and the vehicle turns to the right. When fluid is supplied to the contraction port 21b of the steering cylinder 21 and the extension port 22a of the steering cylinder 22 and fluid is discharged from the extension port 21a of the steering cylinder 21 and the contraction port 22b of the steering cylinder 22, the steering cylinder 21 contracts and the steering cylinder 22 extends. As a result, the steering angle θs changes and the vehicle turns to the left.

A steering angle sensor 104 for detecting a steering angle θs is provided near the linking shaft 13 disposed arranged between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for detecting the stroke of the cylinder, and the steering cylinder 22 is provided with a cylinder stroke sensor 107 for detecting the stroke of the cylinder. Sensing values from these cylinder stroke sensors 106 and 107 may be sent to the controller 28 to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

(a) Main Hydraulic Path

The main hydraulic circuit 30 is a circuit that supplies fluid from a main hydraulic pressure source 31 to the steering cylinders 21 and 22, and has a steering valve 32. The main hydraulic pressure source 31 is made up of a hydraulic pump, a relief valve, and the like.

The steering valve 32 is a flow control valve that adjusts the flow of the fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via the main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

Also, the steering valve 32 has a valve body 33 that can move between a neutral position Ns, a left steering position Ls, and a right steering position Rs. When the valve body 33 is in the neutral position Ns, the main pump port P1 communicates with the main drain port P2. In this case, the first steering port P3 and the second steering port P4 are not in communication. When the valve body 33 is in the left steering position Ls, the main pump port P1 communicates with the first steering port P3, and the main drain port P2 communicates with the second steering port P4. When the valve body 33 is in the right steering position Rs, the main pump port P1 communicates with the second steering port P4, and the main drain port P2 communicates with the first steering port P3.

The steering valve 32 has a first pilot chamber 34 and a second pilot chamber 35. In a state in which no pilot pressure is supplied to the first pilot chamber 34 or the second pilot chamber 35, and the same pilot pressure is supplied to the first pilot chamber 34 and the second pilot chamber 35, the valve body 33 is in the neutral position Ns. In a state in which the pilot pressure is supplied only to the first pilot chamber 34, the valve body 33 is located in the left steering position Ls. In a state in which the pilot pressure is supplied only to the second pilot chamber 35, the valve body 33 is located in the right steering position Rs. When the valve body 33 is located in the left steering position Ls and the right steering position Rs, the steering valve 32 changes the opening surface area through which the fluid from the main hydraulic pressure source 31 passes according to the supplied pilot pressure. Consequently, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying the fluid from the pilot hydraulic pressure source 43 to the first pilot chamber 34 and the second pilot chamber 35 of the steering valve 32.

The pilot hydraulic circuit 40 has a variable pressure reducer 41 and a pilot valve 42.

(i) Variable Pressure Reducer

The variable pressure reducer 41 reduces and adjusts the hydraulic pressure sent from the pilot hydraulic pressure source 43 to the pilot valve 42. The variable pressure reducer 41 incorporates an electromagnetic pressure reducing valve, and receives a command signal from the controller 28 to control the hydraulic pressure.

(ii) Pilot Valve

The pilot valve 42 is a rotary valve that adjusts the pilot pressure inputted from the pilot hydraulic pressure source 43 to the steering valve 32.

Overview of Pilot Valve Configuration

The rotary pilot valve 42 has a pilot pump port P5, a pilot drain port P6, a first pilot port P7, and a second pilot port P8. The pilot pump port P5 is connected to the variable pressure reducer 41 via a pilot hydraulic line 44, and the variable pressure reducer 41 is connected to the pilot hydraulic pressure source 43. The pilot drain port P6 is connected to the drain tank DT for recovering fluid via a pilot drain line 45. The first pilot port P7 is connected to the first pilot chamber 34 of the steering valve 32 via a first pilot line 46. The second pilot port P8 is connected to the second pilot chamber 35 of the steering valve 32 via a second pilot line 47.

The pilot valve 42 has a valve body component 60 that includes an operation spool 71 and an operation sleeve 72. With the operation sleeve 72 as a reference, the operation spool 71 can move between a neutral position Np, a left pilot position Lp, and a right pilot position Rp.

When the operation spool 71 is in the neutral position Np with respect to the operation sleeve 72, the pilot pump port P5, the pilot drain port P6, the first pilot port P7, and the second pilot port P8 communicate with each other. When the operation spool 71 in the left pilot position Lp with respect to the operation sleeve 72, the pilot pump port P5 communicates with the first pilot port P7, and the pilot drain port P6 communicates with the second pilot port P8. Also, when the operation spool 71 is in the right pilot position Rp with respect to the operation sleeve 72, the pilot pump port P5 communicates with the second pilot port P8, and the pilot drain port P6 communicates with the first pilot port P7.

Figure 3:
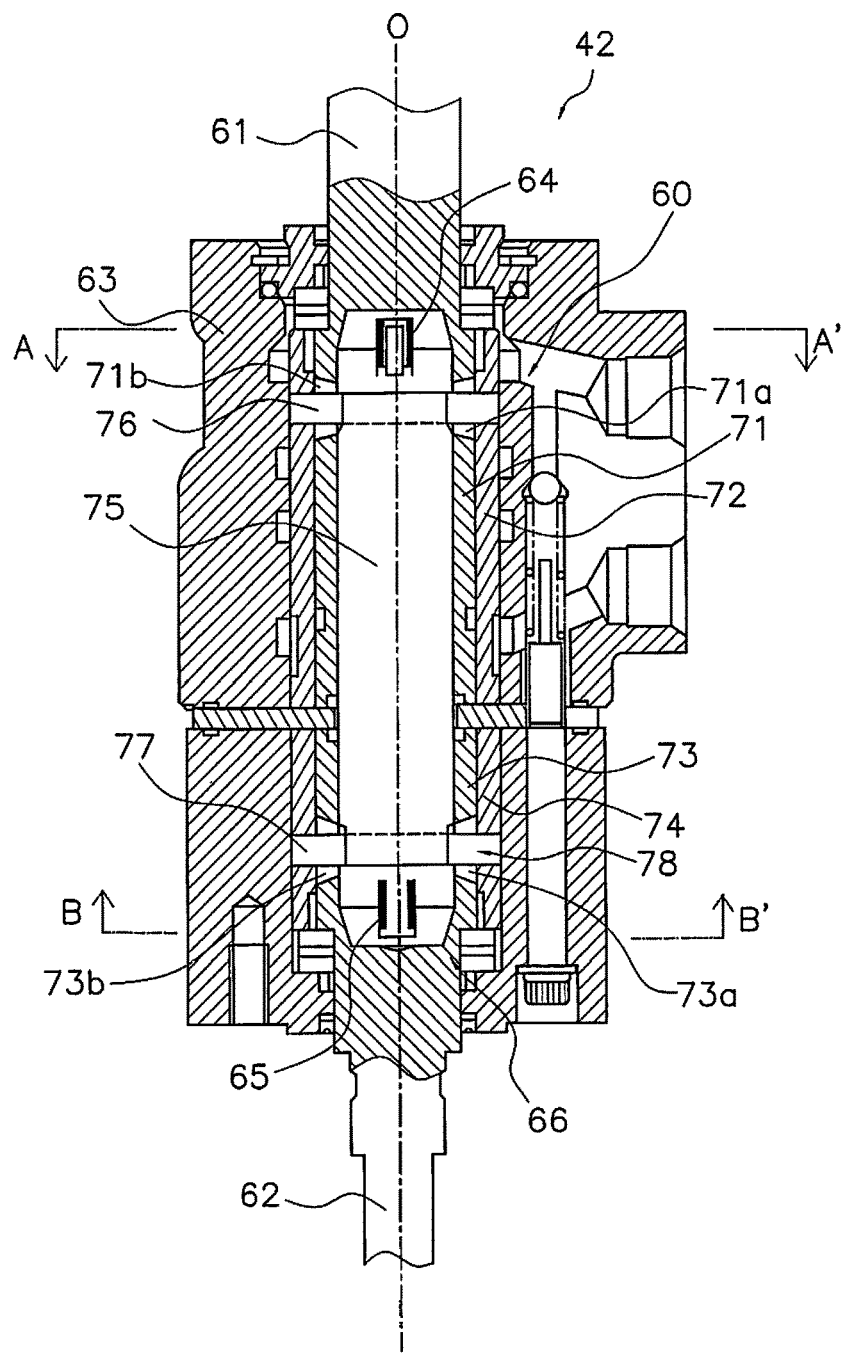
FIG. 3 is a cross section of the configuration of the pilot valve in FIG. 2.

FIG. 3 is a cross section of the configuration of the pilot valve 42.

The pilot valve 42 mainly has the valve body component 60, an operation input shaft 61, a feedback input shaft 62, a housing 63, a first spring 64, a second spring 65, and a feedback component 66.

Operation Input Shaft

The operation input shaft 61 is provided so as to be rotatable around its center axis O, and is inserted into the housing 63. The operation input shaft 61 is linked to the joystick lever 24 (discussed below) via the link 25. The operation input shaft 61 rotates at the same rotational angle as the rotational angle θin to the left and right of the joystick lever 24.

Feedback Input Shaft

The feedback input shaft 62 is disposed coaxially with the operation input shaft 61, and is provided so as to be rotatable around the center axis O. The feedback input shaft 62 is inserted into the housing 63 so as to be opposite the operation input shaft 61. The feedback input shaft 62 is linked to the front frame 11 via a linking mechanism 26 (discussed below) and rotates at the same rotational angle as the steering angle θs of the front frame 11 with respect to the rear frame 12.

Housing

A substantially cylindrical space is formed in the housing 63, and the operation input shaft 61 and the feedback input shaft 62 are inserted as mentioned above. The housing 63 accommodates the valve body component 60 and the feedback component 66, and the pilot pump port P5, the pilot drain port P6, the first pilot port P7, and the second pilot port P8 are formed.

Valve Body Component

The valve body component 60 has the operation spool 71 and the operation sleeve 72, and moves between the neutral position Np, the left pilot position Lp, and the right pilot position Rp when the operation spool 71 rotates with respect to the operation sleeve 72.

The operation spool 71 is substantially cylindrical in shape and disposed coaxially with the operation input shaft 61, and is connected to the operation input shaft 61. The joystick lever 24 is connected to the operation input shaft 61 via the link 25 (discussed below). When the operator operates the joystick lever 24 to the right side by the rotational angle θin, the operation input shaft 61 and the operation spool 71 also rotate to the right around the center axis O by the rotational angle θin. Slits 71a and 71b are formed in the operation spool 71 near the operation input shaft 61 along the peripheral direction at two positions opposite each other so as to sandwich the center axis O in between.

The operation sleeve 72 has a substantially cylindrical shape and is disposed on the outside of the operation spool 71 and inside the housing 63 so as to be rotatable with respect to the operation spool 71 and the housing 63.

In this Specification, the terms right rotation and left rotation indicate the rotation direction when viewed from above.

First Spring

The first spring 64 is inserted between the operation spool 71 and the operation sleeve 72, which are rotatable with respect to each other, and generates a counterforce corresponding to the difference in rotational angle between the two.

Figure 4A:
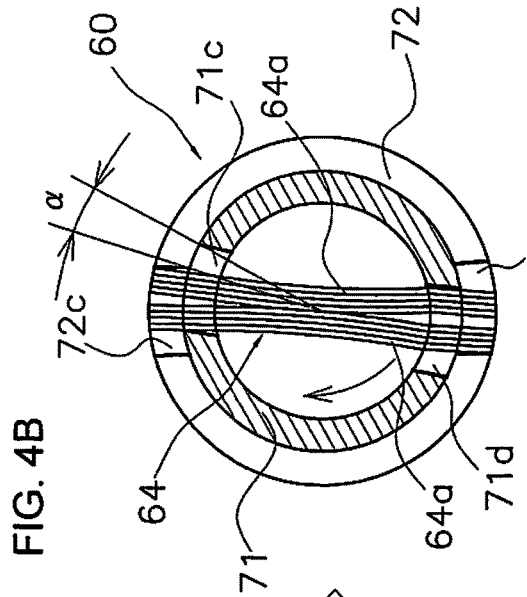
FIGS. 4A and 4B are cross sections along the AA' line in FIG. 3, and FIGS. 4C and 4D are cross sections along the BB' line in FIG. 3.

FIG. 4A is a cross section along the AA' line perpendicular to the center axis O. As shown in FIG. 4A, rectangular holes 71c and 71d are provided to the operation spool 71 on diametrically opposed walls. Rectangular grooves 72c and 72d are formed in the diametrically opposed walls at the end of the operation sleeve 72 on the operation input shaft 61 side. The first spring 64 is formed by two leaf spring units 64a in which a plurality of convex leaf springs are stacked. The two leaf spring units 64a are disposed so that their convex parts are opposite each other so as to form an X shape as in FIG. 4A. The two leaf spring units 64a go through the holes 71c and 71d in the operation spool 71, and both ends thereof go into the grooves 72c and 72d of the operation sleeve 72. The operation spool 71 and the operation sleeve 72 are thus linked by the first spring 64.

As shown in FIG. 4A, a state in which the positions of the hole 71c and the groove 72c in the peripheral direction substantially coincide, and the positions of the hole 71d and the groove 72d in the peripheral direction substantially coincide, is a state in which the valve body component 60 is in the neutral position Np.

Figure 4B:
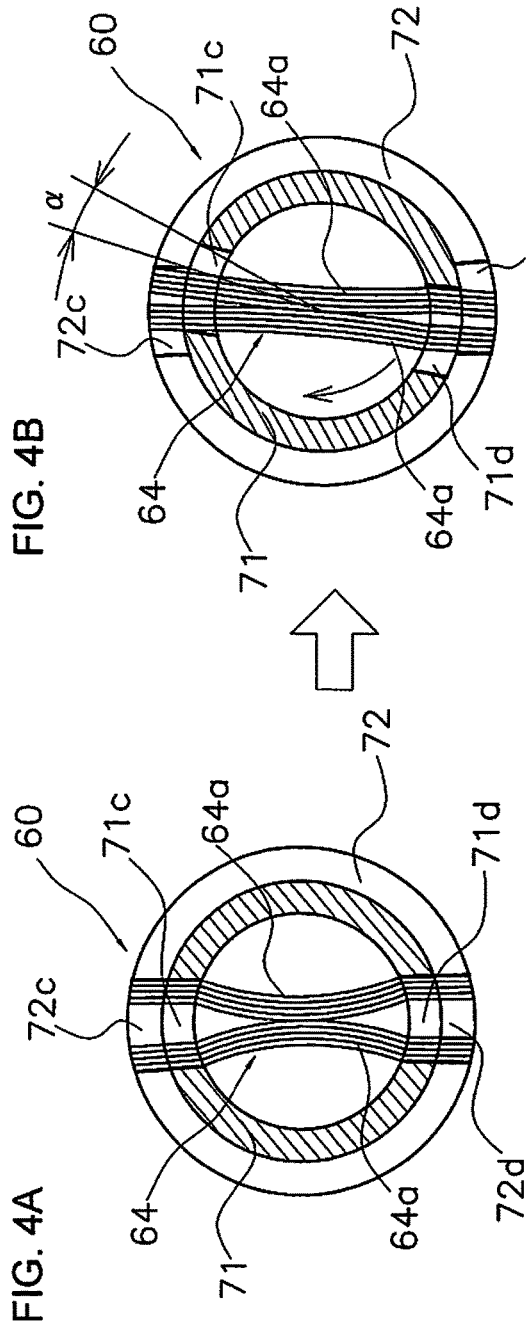

Also, when the joystick lever 24 is operated, the operation spool 71 rotates with respect to the operation sleeve 72 as shown in FIG. 4B, and the operation spool 71 moves with respect to the operation sleeve 72 to the left pilot position Lp or the right pilot position Rp. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated in the joystick lever 24. In other words, the first spring 64 biases the operation spool 71 to the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, coaxially with the operation input shaft 61 and the feedback input shaft 62 (center axis O). The drive shaft 75 is disposed inside the operation spool 71. The first center pin 76 is disposed perpendicular to the center axis O at the end of the drive shaft 75 on the operation input shaft 61 side. Both ends of the first center pin 76 go through the slits 71a and 71b and are fixed to the operation sleeve 72. As will be described in detail below, the first center pin 76 and the slits 71a and 71b restrict the rotational angle of the operation spool 71 with respect to the operation sleeve 72 to an angle within a predetermined range. Since the first center pin 76 is fixed to the operation sleeve 72 and the drive shaft 75, the operation sleeve 72 that is integrated with the drive shaft 75 also rotates when the drive shaft 75 is rotated.

The feedback spool 73 has a substantially cylindrical shape and is disposed coaxially with the feedback input shaft 62, and is linked to the feedback input shaft 62. Slits 73a and 73b are formed near the feedback input shaft 62 of the feedback spool 73 along the peripheral direction at two locations that are opposite each other and sandwich the central axis O in between. The drive shaft 75 is disposed inside the feedback spool 73. The feedback input shaft 62 is linked to the front frame 11 via the linking mechanism 26 (discussed below), and when the front frame 11 rotates to right by the steering angle θs with respect to the rear frame 12, the feedback input shaft 62 and the feedback spool 73 also rotate to the right by the same rotational angle θs as the steering angle θs.

The feedback sleeve 74 is substantially cylindrical in shape, and is disposed outside of the feedback spool 73 and inside the housing 63, rotatably with respect to the feedback spool 73 and the housing 63.

The restrictor 78 restricts the rotation of the feedback sleeve 74 with respect to the feedback spool 73 to an angle within a predetermined range. The restrictor 78 is made up of a second center pin 77 and walls 73ae and 73be (discussed below; see FIG. 7) at both ends in the peripheral direction of the slits 73a and 73b.

The second center pin 77 is disposed perpendicular to the center axis O, at the end of the drive shaft 75 on the feedback input shaft 62 side. Both ends of the second center pin 77 are fixed to the feedback sleeve 74 through the slits 73a and 73b. The second center pin 77 and the slits 73a and 73b restrict the rotation of the feedback sleeve 74 with respect to the feedback spool 73 to an angle within a predetermined range. Also, since the second center pin 77 is fixed to the feedback sleeve 74 and the drive shaft 75, when the feedback sleeve 74 rotates, the drive shaft 75 that is integrated with the feedback sleeve 74 also rotates. The rotation of the drive shaft 75 causes the operation sleeve 72 that is fixed to the drive shaft 75 by the first center pin 76 to rotate.

Second Spring

Figure 4C:
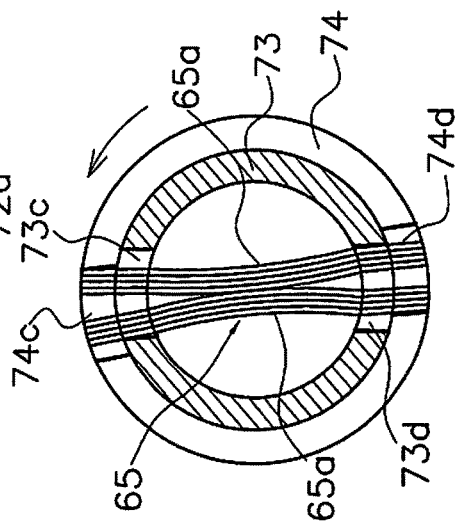

The second spring 65 is inserted between the feedback spool 73 and the feedback sleeve 74, which are able to rotate relative to each other, and generates a counterforce corresponding to the rotational difference between the two. FIG. 4C is cross section along the BB' line in FIG. 3.

As shown in FIG. 4C, square holes 73c and 73d are provided to the diametrically opposed walls of the feedback spool 73.

Also, rectangular grooves 74c and 74d are formed in the diametrically opposed walls at the end of the feedback sleeve 74 on the feedback input shaft 62 side. The second spring 65 is formed from two leaf spring units 65a in which a plurality of convex leaf springs are stacked. The two leaf spring units 65a are disposed so that their convex parts are opposite each other so as to form an X shape as in FIG. 4C. The two leaf spring units 65a go through the holes 73c and 73d in the feedback spool 73, and both ends thereof go into the grooves 74c and 74d of the feedback sleeve 74. The feedback spool 73 and the feedback sleeve 74 are thus linked by the second spring 65. In the state in FIG. 4C, the hole 73c and the groove 74c coincide in the peripheral direction, and the hole 73d and the groove 74d coincide in the peripheral direction. The feedback sleeve 74 is biased by the second spring 65 so that the positions of the grooves 74c and 74d in the peripheral direction match the positions of the holes 73c and 73d of the feedback spool 73 in the peripheral direction.

The first spring 64 bends until the operation spool 71 is restricted with respect to the operation sleeve 72, but the second spring 65 is set so that it begins to bend when subjected to a force that is greater than the counterforce produced by the first spring 64 until the operation spool 71 is restricted.

Figure 4D:
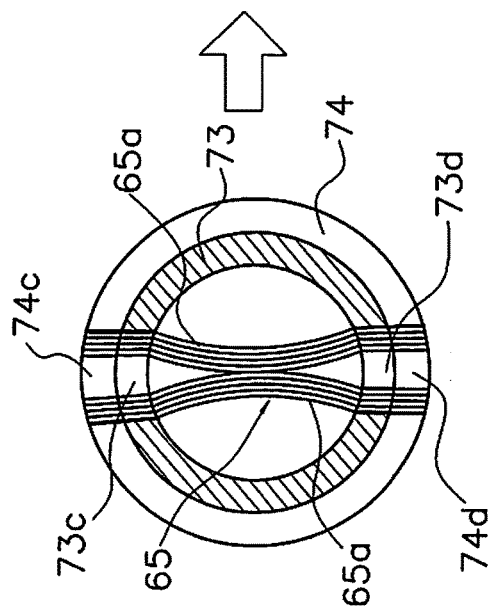
Figure 7:
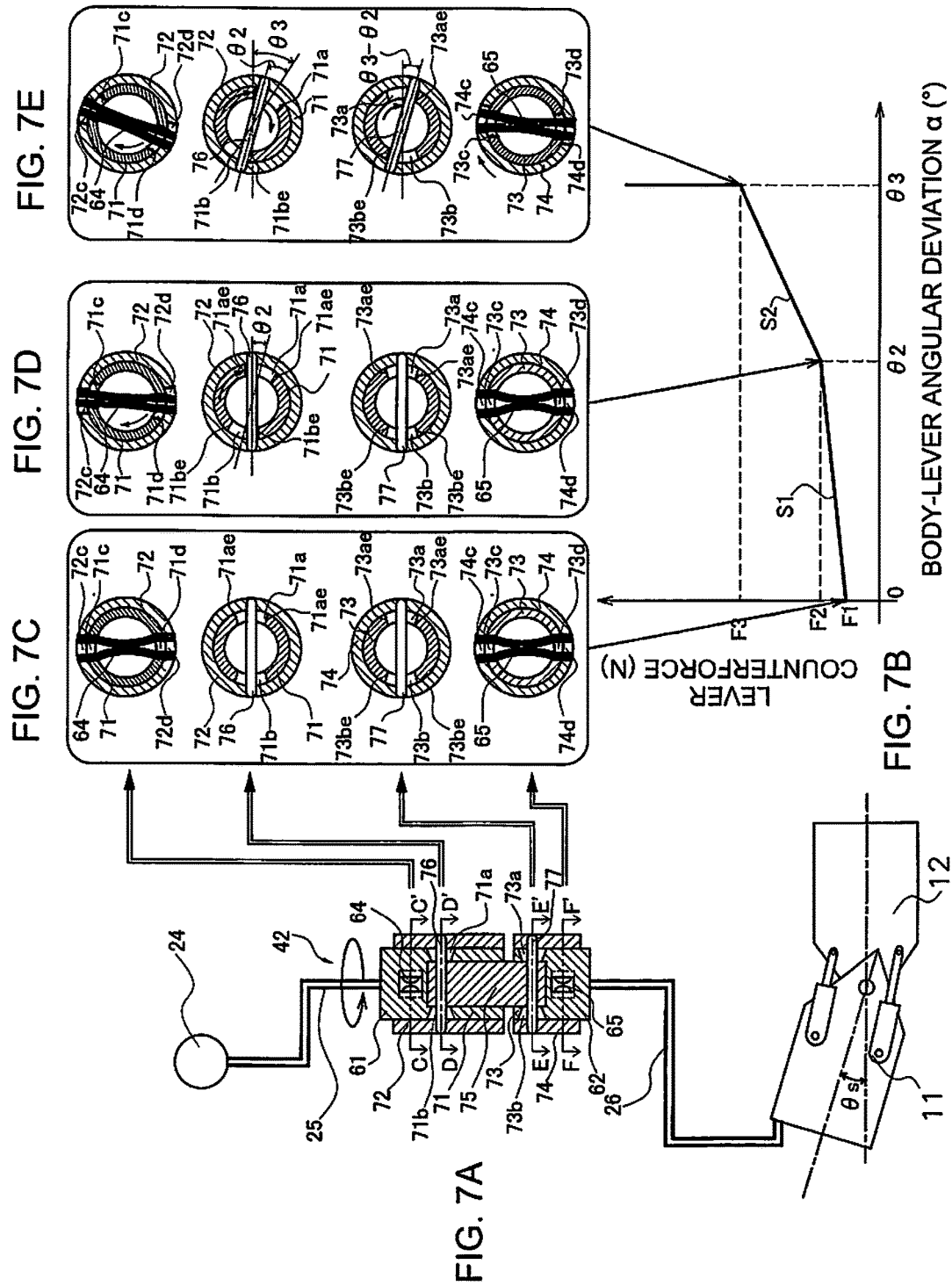
FIG. 7A is a simplified diagram of the pilot valve in FIG. 3.
FIG. 7B is a graph of the relation between the lever counterforce and the body-lever angular deviation in the pilot valve in FIG. 7A.
FIG. 7C is a cross section along the CC', DD', EE', and FF' lines in FIG. 7A when the angular deviation α is zero.
FIG. 7D is a cross section along the CC', DD', EE', and FF' lines in FIG. 7A when the angular deviation α is θ2.
FIG. 7E is a cross section along the CC', DD', EE', and FF' lines in FIG. 7A when the angular deviation α is θ3.

As described later in below through reference to FIG. 7, when the operation spool 71 rotates with respect to the operation sleeve 72 up to the angle at which the operation spool 71 is restricted, and the joystick lever 24 is then operated, as shown in FIG. 4D, the second spring 65 bends and the feedback sleeve 74 rotates with respect to the feedback spool 73. FIG. 4D is a cross section along the BB' line in FIG. 3, and since the view is from below, the arrow indicating the rotational direction is reversed from that in FIG. 4B.

That is, when the joystick lever 24 is operated past the angle at which the operation spool 71 is restricted with respect to the operation sleeve 72, the operator must operate the joystick lever 24 against the biasing force of the second spring 65.

With the above configuration of the feedback unit 66, when the feedback input shaft 62 rotates in accordance with a change in the steering angle, the feedback spool 73 rotates, and the feedback sleeve 74 that is linked to the feedback spool 73 via the second spring 65 also rotates. Then, the operation sleeve 72, which is fixed to the feedback sleeve 74 via the second center pin 77, the drive shaft 75, and the first center pin 76, also rotates, which produces a change in the difference in rotational angle between the operation spool 71 and the operation sleeve 72 and changes the pilot pressure.

That is, with the pilot valve 42, the position of the operating spool 71 with respect to the operation sleeve 72 moves to the neutral position Np, the left pilot position Lp, or the right pilot positions Rp, according to the difference α between the rotational angle θin of the operation input shaft 61 and the rotational angle θfb (matches the steering angle θs) of the feedback input shaft 62. When the rotational angle difference α is zero, the operation spool 71 is in the neutral position Np with respect to the operation sleeve 72. Also, when the operation spool 71 is in the left pilot position Lp or the right pilot positions Rp with respect to the operation sleeve 72, the pilot valve 42 changes the opening surface area through which fluid from the pilot hydraulic source 43 passes, according to the rotational angle difference α. Consequently, the pilot pressure sent from the pilot valve 42 to the steering valve 32 is adjusted according to the rotational angle difference α.

A first rotational angle sensor 101, constituted by a rotary sensor, for example, is provided to the input shaft 61. The first rotational angle sensor 101 senses the rotational angle θin of the operation input shaft 61. A second rotational angle sensor 102, constituted by a rotary sensor, for example, is provided to the feedback input shaft 62. The second rotational angle sensor 102 senses the rotational angle θfb (=θs) of the feedback input shaft 62. The rotational angles θin and θfb sensed by the first rotational angle sensor 101 and the second rotational angle sensor 102 are sent as sensing signals to the controller 28.

As discussed above, the steering angle θs at the linking shaft 13 is also sensed by a steering angle sensor 104, but since the rotational angle θfb of the feedback input shaft 62 matches the steering angle θs, the steering angle sensor 104 may be omitted.

1-2-3. Joystick Lever, Link

Figure 5:
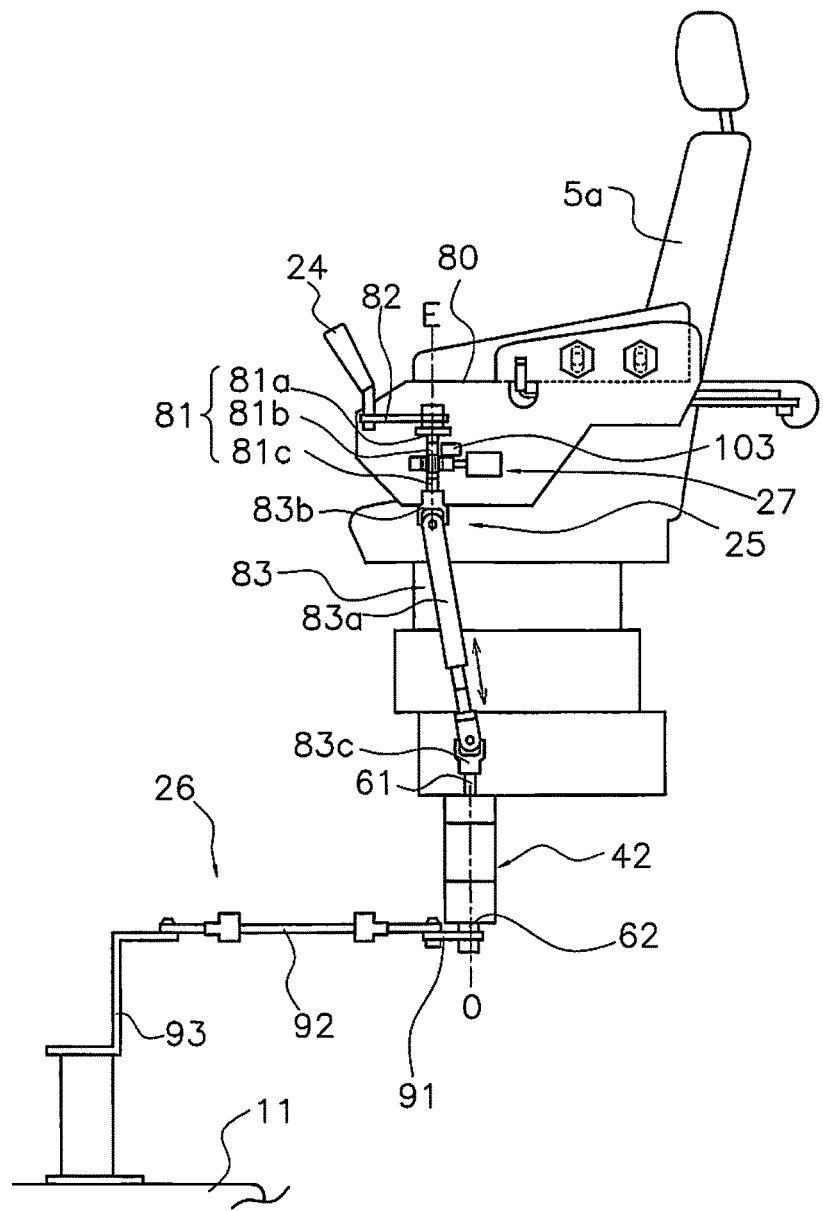
FIG. 5 is a side view of the link and linking mechanism in FIG. 2.

FIG. 5 is a side view of the configuration inside the cab 5. An operator's seat 5a in which the operator sits is provided inside the cab 5. A steering box 80 is disposed on the left side in the vehicle width direction of the operator's seat 5a.

The joystick lever 24 is disposed protruding obliquely upward toward the front from the steering box 80.

The link 25 links the joystick lever 24 and the pilot valve 42. The link 25 mainly has a steering operation shaft 81, a linking bar 82, and a universal joint 83.

The steering operation shaft 81 is disposed vertically, and is supported rotatably around its center axis E by the steering box 80. The linking bar 82 is disposed inside the steering box 80, and links the joystick lever 24 to the steering operation shaft 81.

More precisely, the steering operation shaft 81 is made up of a lever-side shaft 81a, an input shaft 81b, and a valve-side shaft 81c that are connected in that order (see FIG. 8 discussed below). That is, one end of the lever-side shaft 81a is linked to the linking bar 82, and the other end of the lever-side shaft 81a is linked to one end of the input shaft 81b. The other end of the input shaft 81b is connected to one end of the valve-side shaft 81c, and the other end of the valve-side shaft 81c is connected to the universal joint 83. An assist force or a counterforce from the force imparting component 27 (discussed below) is inputted to the input shaft 81b.

The universal joint 83 links the steering operation shaft 81 to the operation input shaft 61 of the pilot valve 42 disposed near the operator's seat 5a. The universal joint 83 has a telescoping center portion 83a and joint portions 83b and 83c disposed at both ends of the center portion 83a. The joint portion 83b is linked to the steering operation shaft 81. The joint portion 83c is linked to the operation input shaft 61.

Figure 6:
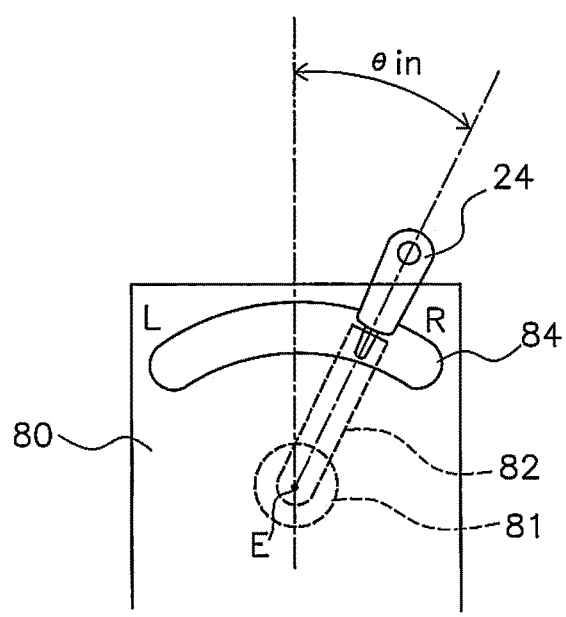
FIG. 6 shows joystick lever in FIG. 5 as seen from above.

FIG. 6 is a plan view of the area near the joystick lever 24 as seen from above. As shown in FIG. 6, the joystick lever 24 is formed protruding obliquely upward from an arc-shaped hole 84 formed in the upper face of the steering box 80. The joystick lever 24 is capable of turning horizontally around the steering operation shaft 81 (more precisely, the center axis E). Also, the edge of the right end of the hole 84 of the steering box 80 is marked with an R, and the edge of the left end is marked with an L.

For example, as shown in FIG. 6, when the operator rotates joystick lever 24 by the rotational angle θin to the right from the center position, the steering operation shaft 81 also rotates to the right by the rotational angle θin. This rotation of the steering operation shaft 81 by the rotational angle θin is transmitted through the universal joint 83 to the operation input shaft 61, and the operation input shaft 61 also rotates to the right by the rotational angle θin. The same applies when the joystick lever 24 is rotated to the left.

In this embodiment, since the steering box 80 is disposed on the left side in the vehicle width direction of the operator's seat 5a, operation of the joystick lever 24 to the right side corresponds to an operation in which the joystick lever 24 is moved to the inside with respect to the operator's seat 5a, and operation of the joystick lever 24 to the left side corresponds to an operation in which the joystick lever 24 is moved to the outside with respect to the operator's seat 5a. It is generally easier for an operator to bend his wrist to the inside of the operator's seat 5a than to the outside when he is seated in the operator's seat 5a.

1-2-4. Linking Mechanism

The linking mechanism 26 has a follow-up lever 91, a follow-up link 92, and a bracket 93. The follow-up link 92 is fixed to the feedback input shaft 62 of the pilot valve 42. The bracket 93 is fixed to the front frame 11. The follow-up link 92 is linked to the follow-up lever 91 and the bracket 93.

This linking mechanism 26 links the front frame 11 to the pilot valve 42 disposed on the rear frame 12.

The linking mechanism 26 makes the steering angle θs of the front frame 11 with respect to the rear frame 12 be the same as the rotational angle θfb of the feedback input shaft 62.

That is, when the front frame 11 rotates to the right side around the linking shaft 13 with respect to the rear frame 12 by the steering angle θs, the feedback input shaft 62 also rotates right by the rotational angle θs via the linking mechanism 26, and when the front frame 11 rotates to the left side by the steering angle θs, the feedback input shaft 62 also rotates left by the rotational angle θs via the linking mechanism 26.

1-2-5. Lever Counterforce

The lever counterforce produced by the first spring 64 and the second spring 65 when the joystick lever 24 is operated will now be described.

FIG. 7A is a simplified diagram of the pilot valve 42. FIG. 7B is a graph of the relation between lever counterforce and the body-lever angular deviation. The body-lever angular deviation α is the difference (θin−θfb) between the rotational angle θin of the joystick lever 24 and the steering angle θs of the front frame 11 with respect to the rear frame 12. FIG. 7C is a cross section along the CC', DD', EE', and FF' lines in FIG. 7A when the angular deviation α is zero. FIG. 7D is a cross section along the CC', DD', EE', and FF' lines in FIG. 7A when the angular deviation α is θ2, and FIG. 7E is a cross section along the CC', DD', EE', and FF' lines in FIG. 7A when the angular deviation α is θ3. As shown in FIG. 7A, the cross sections along the CC', DD', EE', and FF' lines are all as seen from above. In FIG. 7B, play in the joystick lever 24 is not taken into account in order to make the illustration easier to understand.

When the operator rotates the joystick lever 24 by the rotational angle θin from the center position, the operation input shaft 61 also rotates by the rotational angle θin. Meanwhile, since the response of the steering cylinders 21 and 22 is delayed, the steering angle θs increases gradually in accordance with the rotational angle θin. The rotational angle θin of the joystick lever 24 represents the target steering angle, while the steering angle θs indicates the actual steering angle. The feedback input shaft 62 also rotates by the same rotational angle θs in response to a change in the steering angle θs. The feedback spool 73 also rotates together with the feedback input shaft 62, and this rotation causes the feedback sleeve 74 linked via the second spring 65 to rotate as well.

Since the feedback sleeve 74 and the operation sleeve 72 are integrated with the first center pin 76, the second center pin 77, and the drive shaft 75, rotation of the feedback sleeve 74 causes the operation sleeve 72 to rotate as well.

Specifically, the difference between the rotational angle of the operation spool 71 and the rotational angle of the operation sleeve 72 corresponds to the angular deviation α (see FIG. 4B).

Since the first spring 64 biases the operation spool 71 to the neutral position Np with respect to the operation sleeve 72, the joystick lever 24 must be operated against the biasing force of the first spring 64 in order to increase the angular deviation α.

The first spring 64 has the spring property S1 shown in FIG. 7B. With the spring property S1 of the first spring 64, the joystick lever 24 must be operated with a force at or above an initial counterforce F1 (the force required to begin to bend the first spring 64) in order to rotate the operation input shaft 61. Also, with the spring property S1 of the first spring 64, the lever counterforce increases in proportion to the angular deviation α. That is, as the angular deviation α increases, the force required to operate the joystick lever 24 increases.

As shown in FIG. 7C, in the neutral position Np where the angular deviation α is zero, the first center pin 76 is disposed in the center of the slits 71a and 71b of the operation the spool 71. The second center pin 77 is disposed in the center of the slits 73a and 73b of the feedback spool 73.

The joystick lever 24 is then rotated to the right side, for example, to increase the angular deviation α, and when the angular deviation α reaches the angle θ2, as shown in FIG. 7D, the first center pin 76 hits the wall 71ae formed in the peripheral direction of the slit 71a, and the wall 71be formed in the peripheral direction of the slit 71b. At this point the second center pin 77 is disposed in the center of the slits 73a and 73b of the feedback spool 73. This is because if we let F2 be the counterforce produced by the first spring 64 when the angular deviation α is the angle θ2, the initial counterforce (the force needed to start bending the second spring 65) is set to F2 as indicated by the spring property S2 of the second spring 65. The initial counterforce of the second spring 65 may be set higher than F2, or may be greater than or equal to F2.

Furthermore, the operator must operate the joystick lever 24 against the counterforce of the second spring 65 to rotate it to the right side. That is, when the joystick lever 24 is further rotated to the right side, since the first center pin 76 is hitting the walls 71ae and 71be, it is necessary to rotate the operation sleeve 72 if an attempt is made to rotate the operation spool 71. Also, as discussed above, the operation sleeve 72 is integrated with the feedback sleeve 74, and the feedback spool 73 is connected to the feedback input shaft 62. Therefore, when the joystick lever 24 is further rotated to the right side, the operator operates against the counterforce of the second spring 65, as shown in FIG. 7D. When the angular deviation α reaches θ3, as shown in FIG. 7E, the second center pin 77 hits the wall 73ae formed in the peripheral direction of the slit 73a and the wall 73be formed in the peripheral direction of the slit 73b. Thus, the second center pin 77 is able to rotate by an angle (θ3−θ2). That is, the pilot valve 42 is configured so that the angular deviation α will not exceed the angle θ3. Therefore, as shown in FIG. 7B, the lever counterforce goes straight up at the angle θ3. If the second center pin 77 strikes the walls 73ae and 73be with sufficient energy, a sharp rebound will be generated to put a burden on the operator's wrist. This angle θ3 is also referred to as the catch-up angle.

In FIG. 7B, an example was illustrated in which the joystick lever 24 was rotated to the right side, but the same applies when the rotation is to the left side, in which case the angular deviation α becomes a negative value (refer to dotted line shown in FIG. 10B discussed below). That is, the first center pin 76 hits the walls 71ae and 71be at an angle of −θ2, and the second center pin 77 hits the walls 73ae and 73be at −θ3. Thus, the pilot valve 42 is configured so that the absolute value of the angular deviation α will not exceed the angle θ3.

Until the angular deviation α reaches θ2, there will be a difference between the rotational angle of the operation spool 71 and the rotational angle of the operation sleeve 72, but once the angle θ2 is exceeded, there is no longer any difference between the rotational angles of the operation spool 71 and the operation sleeve 72, so the aperture of the pilot valve 42 stays constant. Also, while the aperture of the pilot valve 42 remains constant when the angular deviation α is between the angles θ2 and θ3, the pilot pressure should be varied according to the angular deviation by controlling the variable pressure reducer 41.

1-2-6. Force Imparting Component

Figure 8:
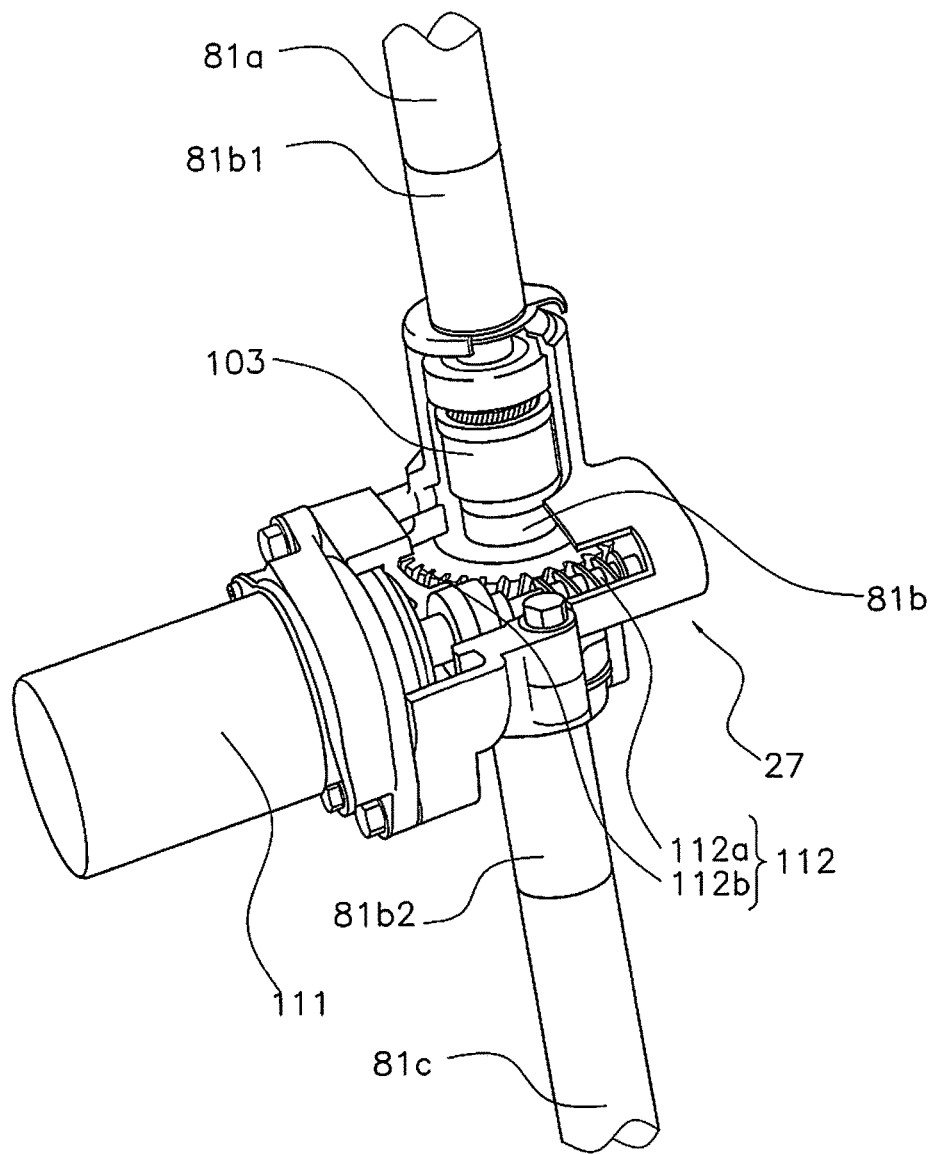
FIG. 8 is an oblique view of the configuration of the force imparting component in FIG. 2.

FIG. 8 is an oblique view of the force imparting component 27. The force imparting component 27 imparts an assist force or counterforce to the operation of the joystick lever 24. The force imparting component 27 has an electric motor 111 and a worm gear 112. The worm gear 112 has a cylindrical worm 112a and a worm wheel 112b. The worm wheel 112b is provided around the above-mentioned input shaft 81b, and meshes with the cylindrical worm 112a. The output shaft of the electric motor 111 is connected to the cylindrical worm 112a, and rotates the cylindrical worm 112a around its center axis. The electric motor 111 is driven on the basis of a command from a drive circuit 204 provided to the controller 28.

The first end 81b1 of the input shaft 81b is connected to the lever-side shaft 81a, and the second end 81b2 is connected to the valve-side shaft 81c.

When the electric motor 111 is driven, the cylindrical worm 112a rotates, this rotation causes the worm wheel 112b to rotate, and rotational force is also produced at the input shaft 81b that is fixed to the worm wheel 112b. Rotational force can be applied for left rotation or right rotation to the input shaft 81b by changing the direction of rotation of the cylindrical worm 112a.

For example, when the joystick lever 24 is rotated to the right, an assist force is imparted to the operation of the joystick lever 24 by applying a force in the right rotation direction to the input shaft 81b. Also, when the joystick lever 24 is rotated to the right, a counterforce is imparted to the operation of the joystick lever 24 by applying a force in the left rotation direction to the input shaft 81b.

A torque sensor 103 is provided to the input shaft 81b. The torque sensor 103 senses the torque generated at the input shaft 81b exerted on the joystick lever 24 by the operator. The torque sensor 103 in this embodiment, for example, senses the torque generated at the input shaft 81b and the rotation direction of the input shaft 81b by sensing the twisting of a torsion bar with a coil, for example. The sensed rotation direction and torque T are outputted to the controller 28 as a steering torque signal.

1-2-7. Controller

The controller has includes an arithmetic unit such as a CPU, and a storage device such as a RAM or a ROM.

The controller 28 has the drive circuit 204, and the electric motor 111 is controlled by the drive circuit 204.

The controller 28 outputs a command signal to the electric motor 111 and the variable pressure reducer 41 over a wire or wirelessly, to control the electric motor 111 and the variable pressure reducer 41.

The rotational angle θin of the operation input shaft 61 sensed by the first rotational angle sensor 101, the rotational angle θfb (=θs) of the feedback input shaft 62 sensed by the second rotational angle sensor 102, and the steering angle θs sensed by the steering angle sensor 104 are inputted as sensing signals to the controller 28.

The vehicle speed V sensed by a vehicle speed sensor 105 is also inputted as a sensing signal to the controller 28. Further, the torque T sensed by the torque sensor 103 is inputted as a steering torque signal to the controller 28.

The controller 28 controls the variable pressure reducer 41 on the basis of the rotational angle θin, the rotational angle θfb (=θs), and the vehicle speed V. Consequently, the source pressure of the pilot pressure sent to the pilot valve 42 can be controlled so that there will be no abrupt changes in the flow of fluid to the left and right steering cylinders 21 and 22.

Also, the controller 28 controls the electric motor 111 on the basis of the rotational angle θin, the rotational angle θfb (=θs), the vehicle speed V, the steering torque signal (including the torque T), and so forth.

Thus, the controller 28 can impart an assist force or counterforce to the operation of the joystick lever 24 by the operator by driving the electric motor 111 on the basis of the value of the torque T.

2. Operation

The steering operation with the wheel loader 1 in this embodiment will now be described.

2-1. Steering Operation

If the joystick lever 24 is in the center position, the operation input shaft 61 is located in a predetermined initial position, and the rotational angle θin produced by the operation input shaft 61 is zero. Also, since the steering angle θs is zero, the feedback input shaft 62 is also located in a predetermined initial position. In this embodiment, as shown in FIG. 7A, the steering angle θs indicates the angle from a state in which the angle along the longitudinal direction with respect to the rear frame 12 is zero. As shown in FIG. 6, the rotational angle θin indicates the rotational angle from the center position of the joystick lever 24. Also, in finding the angular deviation, computation may be performed using a positive angle for rotation to the right and a negative angle for rotation to the left, for example.

At this point, the operation spool 71 is located in the neutral position Np shown in FIG. 4A with respect to the operating sleeve 72. In this case, the pilot pressure in the first pilot chamber 34 and in the second pilot chamber 35 of the steering valve 32 is the same, and the valve body 33 of the steering valve 32 is also in the neutral position Ns. Therefore, no fluid is supplied or discharged to or from the left and right steering cylinders 21 and 22, the steering angle θs is maintained at zero, and the rotational angle θfb (=θs) of the feedback input shaft 62 is also maintained at zero.

Next, the operator exerts an operation force Fin to rotate the joystick lever 24 to the right side from the center position as shown in FIG. 6. When the operating force Fin exceeds F1 of the first spring 64, the operation input shaft 61 rotates to the right the same as the joystick lever 24, and the rotational angle θin of the first operation input shaft 61 is increased. At this point, because of the delay in the response of the left and right steering cylinders 21 and 22, the steering angle θs is still at zero, and the rotational angle θfb (=θs) of the feedback input shaft 62 is also zero. Therefore, the angular deviation (α=θin−θs) between the rotational angle θin and the steering angle θs increases.

The operation spool 71 rotates to the right with respect to the operation sleeve 72 together with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is at or above the counterforce of the spring property S1 of the first spring 64 shown in FIG. 7B. Therefore, the operation sleeve 72 does not rotate along with the operating spool 71, and operating the spool 71 rotates to the right with respect to the operation sleeve 72.

Thus, the operating spool 71 rotates to the right with respect to the operation sleeve 72 and moves to the right pilot positions Rp, pilot pressure is supplied to the second pilot port P8, and the pilot pressure is supplied to the second pilot chamber 35.

Thus, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering to cylinder 21 and the extension port 22a of the steering cylinder 22. This gradually increases the steering angle θs, and the front frame 11 is oriented in the right direction with respect to the rear frame 12 (see R in FIG. 2). This change in the steering angle θs is transmitted by the linking mechanism 26 to the feedback input shaft 62, and the feedback input shaft 62 rotates at the rotational angle θs.

When the operator stops the joystick lever 24 at a predetermined rotational angle θ1, the operation input shaft 61 also stops at the rotational angle θ1. On the other hand, since the steering angle θs is gradually increasing, the rotational angle θs of the feedback input shaft 62 also increases. The feedback spool 73 also rotates along with the feedback input shaft 62, and the feedback sleeve 74 linked via the second spring 65 to the feedback spool 73 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. Rotation of the operation sleeve 72 reduces the difference in the rotational angle (deflection angle α) between the operation sleeve 72 and the operation spool 71. When the steering angle θs (the rotational angle θs of the feedback input shaft 62) catches up with the rotational angle θ1 (the rotational angle θin of the operation input shaft 61), the angular deviation α drops to zero. At this point, the operation spool 71 of the pilot valve 42 is located in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs is maintained at the rotational angle θ1.

When the joystick lever 24 is thus rotated to the right side and stopped at a predetermined rotational angle θ1, the steering angle θs is also maintained at the same rotational angle θ1. This keeps the front frame 11 oriented in the direction of the rotational angle θ1, to the right with respect to the rear frame 12.

When the operator then returns the joystick lever 24 from the right side position to the center position, the operation input shaft 61 similarly rotates, which reduces the rotational angle θin of the operation input shaft 61. At this point, because of the delay in the response of the left and right steering cylinders 21 and 22, the steering angle θs is still the rotational angle θ1. Therefore, the rotational angle difference α (=θin−θs) decreases from zero and becomes negative. Then, the operation spool 71 rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. This gradually reduces the steering angle θs from the rotational angle θ1. This change in the steering angle θs is transmitted by the linking mechanism 26 to the feedback input shaft 62, and the feedback input shaft 62 rotates at the same change in rotational angle as the change in the steering angle θs.

When the operator stops the joystick lever 24 in its center position, the operation input shaft 61 also stops at its initial position, that is, at a position where the rotational angle θin is zero. Meanwhile, since the steering angle θs is gradually decreasing from the rotational angle θ1, the difference in rotational angle (angular deviation) α decreases gradually. When the steering angle θs reaches zero, the rotational angle θfb (=θs) of the feedback input shaft 62 also reaches zero, and the rotational angle difference α becomes zero. At this point, the operation spool 71 is disposed in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs goes back to zero and is maintained there. Consequently, the front frame 11 is returned to an orientation along the longitudinal direction with respect to the rear frame 12.

The situation is the same when the joystick lever 24 is rotated to the left side, and will therefore not be described here.

2-2. Control of Force Imparting Component

Next, the control of the force imparting component 27 when the joystick lever 24 is operated as above will be described.

With the wheel loader 1 in this embodiment, the force imparting component 27 is controlled so that the force imparted to the operation of the joystick lever 24 will be different when the operator moves the joystick lever 24 to the right side (to the inside with respect to the operator's seat 5a) and when he moves the joystick lever 24 to the left side (to the outside with respect to the operator's seat 5a).

The controller 28 stores assist torque information related to the assist torque imparted to the torque inputted by the joystick lever 24, and controls the force imparting component 27 on the basis of this assist torque information.

2-2-1. Assist Torque Information

For ease of explanation, first the assist torque information when imparting the same force to left and right operations will be described as a comparative example through reference to FIGS. 9A and 9B, after which assist torque information when the force imparted to left and right operations is varied in this embodiment will be described through reference to FIGS. 10A and 10B.

(a) When Forces Imparted to Left and Right Operations are Equal

FIG. 9A is a graph (assist torque information) of the torque sensed by the torque sensor 103 and the assist torque that is imparted, and is a graph of when the forces imparted in right and left operations are the same. In the graph shown in FIG. 9A, the positive lever input torque indicates the torque produced by the rotation of the joystick lever 24 to the right side, and the negative lever input torque indicates the torque produced by the rotation of the joystick lever 24 to the left side. Also, the positive assist torque indicates the force exerted on the input shaft 81b in right rotation, while the negative assist torque indicates the force exerted on the input shaft 81b in left rotation. The same applies in the drawings discussed below. That is, the line L1 in FIG. 9A shows assist torque information when the joystick lever 24 is operated to the right side, and the line L2 shows assist torque information when the joystick lever 24 is operated to the left side.

FIG. 9A also shows a dotted line L2' that is symmetrical with the line L2 with respect to the horizontal axis. As can be seen from a comparison of the dotted line L2' and the line L1, when the absolute value of the lever input torque is the same, the absolute value of the assist torque will be the same. That is, assist force is imparted in left and right symmetry when the joystick lever 24 is operated to the right side and when the joystick lever 24 is operated to the left side. The lines L1 and L2 can also be said to be in point symmetry around the origin.

In the graph of FIG. 9A, a larger assist force is imparted as the torque generated by operation of the joystick lever 24 increases.

Assuming that control is performed using the graph of FIG. 9A, when the operator operates the joystick lever 24 and torque is generated at the input shaft portion 81b, the controller 28 finds the assist force on the basis of the graph shown in FIG. 9A from that torque, and controls the electric motor 111 so as to impart that assist force.

FIG. 9B shows the lever counterforce versus the angular deviation when no assist force is imparted (dotted line) and when assist force is imparted on the basis of the graph in FIG. 9A. In FIG. 9B, the positive angular deviation α indicates when the operation input shaft 61 has a larger rotational angle to the right rotation side than the feedback input shaft 62, and the negative angular deviation α indicates when the operation input shaft 61 has a larger rotational angle to the left rotation side than the feedback input shaft 62. As shown in FIG. 9B, the lever counterforce can be reduced in operation of the joystick lever 24, and it can be operated with a lighter force.

(b) When Forces Imparted to Left and Right Operations are Varied

Figure 10A:
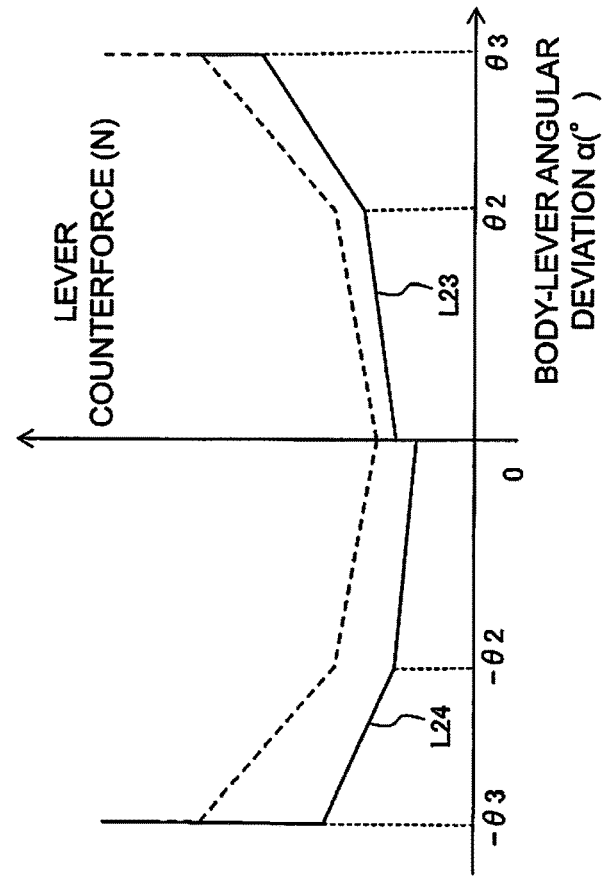
FIG. 10A is a graph of the relation between assist torque and lever input torque when the forces applied in left and right operations in this embodiment are different.

FIG. 10A is a graph (assist torque information) of the relation between the torque sensed by the torque sensor 103 and the assist torque that is imparted, and is a graph of when the forces imparted to left and right operations are different. The assist torque information shown in FIG. 10A is stored in the controller 28. The line L3 indicates assist torque information when the joystick lever 24 is operated to the right side, and the line L4 indicates assist torque information when the joystick lever 24 is operated to the left side.

FIG. 10A also shows a dotted L4' that is symmetrical with the line L4 with respect to the horizontal axis, as can be seen from a comparison of the dotted L4' with the line L3, when the torque T produced by rotation of the joystick lever 24 is the same value, the assist force for operation to the left is set to be higher than the assist force for operation to the right. That is, the assist force is set so that the joystick lever 24 can be operated with a lighter force when operated to the outside with respect to the operator's seat 5a than when operated to the inside.

When the operator operates the joystick lever 24 and torque is produced at the input shaft 81b, the controller 28 finds the assist torque (assist force) on the basis of the assist torque information shown in FIG. 10A from this produced torque, and controls the electric motor 111 so as to impart that assist force.

Figure 10B:
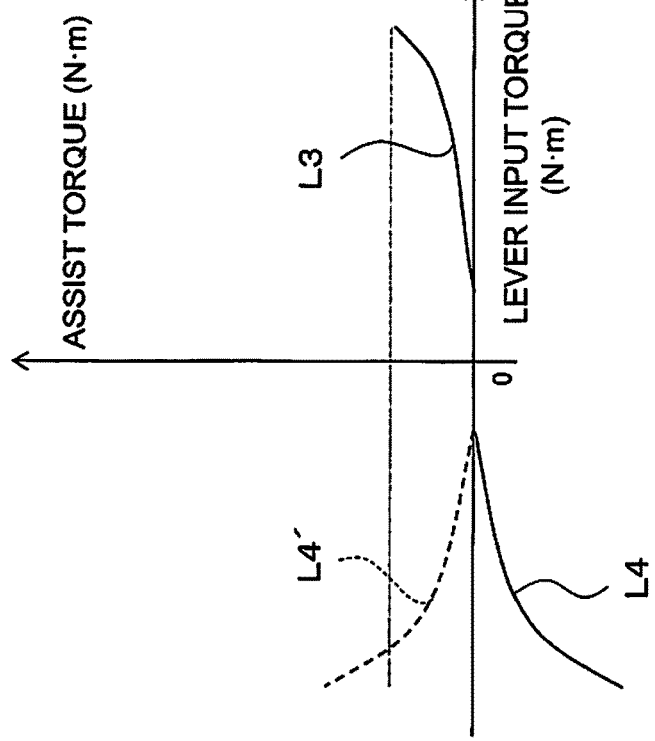
FIG. 10B is a graph of the relation between lever counterforce and body-lever angular deviation when the assist torque shown in FIG. 10A is and is not imparted.

FIG. 10B shows lever counterforce versus angular deviation when no assist force is imparted (dotted line) and when an assist force is imparted based on the graph of FIG. 10A (solid lines L23 and L24). In FIG. 10B, the positive angular deviation α indicates when the operation input shaft 61 has a larger rotational angle to the right rotation side than the feedback input shaft 62, while the negative angular deviation α indicates when the operation input shaft 61 has a larger rotational angle to the left rotation side than the feedback input shaft 62.

As shown in FIG. 10B, the lever counterforce when the joystick lever 24 is operated to the left side (solid line L24) can be made smaller than the lever counterforce when the joystick lever 24 is operated to the right side (solid line L23). The controller 28 may store the assist torque information shown in FIG. 10A as an expression of a curve or a straight line, or may store it as a table.

2-2-2. Control Operation

Figure 11:
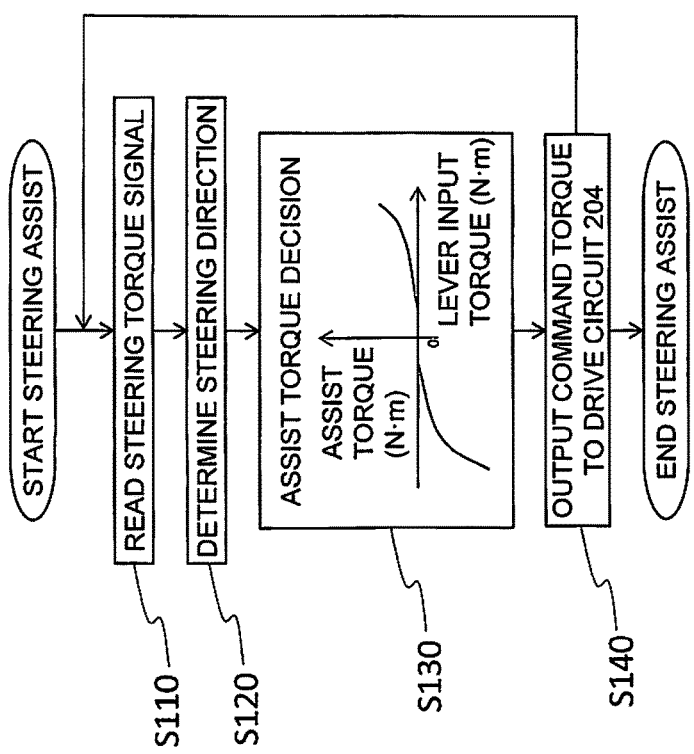
FIG. 11 is a flowchart showing a method for controlling a wheel loader according in Embodiment 1 of the present invention.

FIG. 11 is a flowchart of the control operation by the force imparting component 27.

When the joystick lever 24 is operated, in step S110 the steering torque signal sensed by the torque sensor 103 is inputted to the controller 28. The steering torque signal is a signal including information about the rotation direction and the magnitude of the torque produced by that rotation. For example, when the torque values include positive and negative values, a positive torque value indicates a torque value produced by right rotation, while a negative torque value indicates a torque value produced by left rotation.

Next, in step S120, the controller 28 determines the steering direction of the joystick lever 24 on the basis of the steering torque signal.

Then, in step S130, the controller 28 determines the assist force on the basis of the stored assist torque information (the graph shown in FIG. 10A).

Next, in step S140, the controller 28 outputs a command torque from the drive circuit 204 on the basis of the decided assist torque, the electric motor 111 is driven, and a force is imparted to the operation of the joystick lever 24 via the link 25.

The above control allows the lever counterforce when the joystick lever 24 is operated to the left to be made smaller than the lever counterforce when operating the joystick lever 24 to the right.

Embodiment 2

Next, the wheel loader 1 in Embodiment 2 pertaining to the present invention will be described. The wheel loader 1 in Embodiment 2 has basically the same configuration as in Embodiment 1, but control is performed so as to change the imparted force on the basis of the vehicle speed in addition to the operation direction of the joystick lever 24. Therefore, the description will focus on this difference.

1. Assist Torque Information

Figure 12:
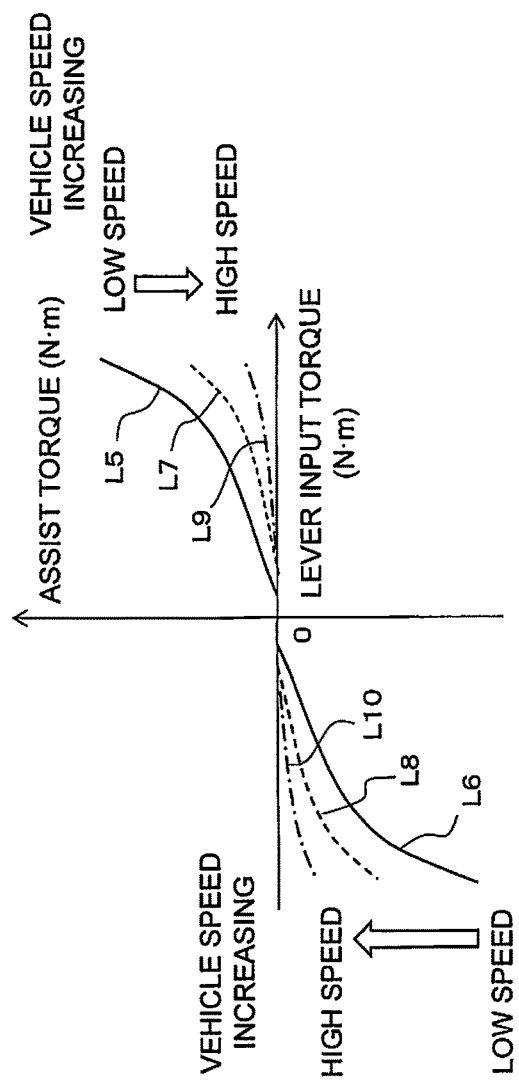
FIG. 12 is a graph of the relation between assist torque and lever input torque at three different vehicle speeds when the forces applied to left and right operations are equal.
Figure 13:
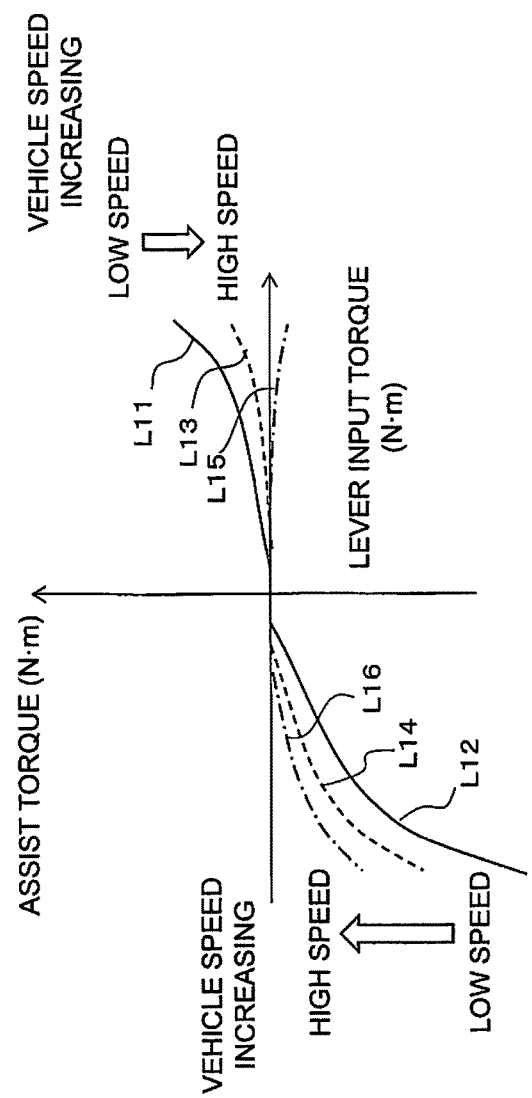
FIG. 13 is a graph of the relations between assist torque and lever input torque at three different vehicle speeds when the forces imparted to left and right operations in this embodiment are different.

To make the description easier to understand, first we will describe the assist torque information when the torque is changed depending on vehicle speed for a case in which the same force is imparted to left and right operations through reference to FIG. 12, and then we will describe the assist torque information in this embodiment through reference to FIG. 13.

1-1. When Imparted Force is Same for Left and Right Operations

FIG. 12 is a graph of the relation between the torque sensed by the torque sensor 103 and the assist torque that is imparted, and is a graph of the change in assist torque as a function of speed when the force imparted is the same for right and left operations. In FIG. 12, the solid lines (L5 and L6) indicate assist torque information at a vehicle speed of 0 km/h, the dotted lines (L7 and L8) indicate the assist torque information at a vehicle speed of 25 km/h, and the one-dot chain lines (L9 and L10) indicate the assist torque information at a vehicle speed of 40 km/h. As shown in FIG. 12, for example, graphs (assist torque information) of the relation between assist torque and lever counterforce at 40 km/h, 25 km/h, and 0 km/h are provided.

Also, in the example in FIG. 12 in which the force imparted to left and right operations is the same, the relation between lever input torque and assist torque on the left and right sides at various speeds is in point symmetry with respect to the origin. More precisely, the line L5 indicating the assist torque when the joystick lever 24 is operated to the right at 0 km/h and the line L6 indicating the assist torque when the joystick lever 24 is operated to the left at 0 km/h are in point symmetry with respect to the origin. Similarly, the lines L7 and L8 at 25 km/h are in point symmetry with respect to the origin, and the lines L9 and L10 at 40 km/h are in point symmetry with respect to the origin.

As shown in FIG. 12, the assist torque is set so decrease as the speed increases. Consequently, operation becomes easier because the assist torque is higher during low-speed travel, and the assist torque is lower during high speed travel and vehicle stability is improved.

1-2. When Force Imparted to Left and Right Operations is Varied

FIG. 13 is a graph (assist torque information) of the relation between the torque sensed by the torque sensor 103 in this embodiment and the assist torque that is imparted. FIG. 13 is also a graph (assist torque information) of changing the assist torque on the basis of vehicle speed when the force imparted to left and right operations is different. In FIG. 13, the solid lines (L11 and L12) indicate assist torque information at a vehicle speed of 0 km/h, the dotted lines (L13 and L14) indicate assist torque information at a vehicle speed of 25 km/h, and the one-dot chain lines (L15 and L16) indicate assist torque information at a vehicle speed of 40 km/h.

As shown in FIG. 13, the controller 28 stores graphs (assist torque information) of the relation between assist torque and lever counterforce at 40 km/h, 25 km/h, and 0 km/h.

As shown in FIG. 13, with the wheel loader 1 in this embodiment, the assist force imparted during operation of the joystick lever 24 to the right side is set smaller than the assist force imparted during operation to the left side. That is, it is set so that the joystick lever 24 can be operated to the outside with respect to the operator's seat 5a with a lighter force than to the inside.

More precisely, the line L11 indicating the assist torque when the joystick lever 24 is operated to the right at a vehicle speed of 0 km/h and the line L12 indicating the assist torque when the joystick lever 24 is operated to the left at a vehicle speed of 0 km/h are not in point symmetry with respect to the origin, with the absolute value of the assist torque with respect to the lever counterforce being greater with the line L12 than the line L11. Also, the line L13 indicating the assist torque when the joystick lever 24 is operated to the right at a vehicle speed of 25 km/h and the line L14 indicating the assist torque when the joystick lever 24 is operated to the left at a vehicle speed of 25 km/h are not in point symmetry with respect to the origin, with the absolute value of the assist torque with respect to the lever counterforce being greater with the line L14 than the line L13.

Also, the line L16 indicating the assist torque when the joystick lever 24 is operated to the left at a vehicle speed of 40 km/h represents a lower absolute value of the assist torque than the line L14 at a vehicle speed of 25 km/h.

As can be seen from the line L15, which indicates the assist torque when the joystick lever 24 is operated to the right at a vehicle speed of 40 km/h, when the joystick lever 24 is operated to the right at a vehicle speed of 40 km/h, a counter assist force is imparted to the operation of the joystick lever 24. More precisely, when the joystick lever 24 is rotated to the right, the force imparting component 27 imparts a force in the left rotation direction to the input shaft portion 81*b*. This prevents the joystick lever 24 from being abruptly operated during high-speed travel toward the right (to the inside with respect to the operator's seat 5*a*), which is the direction in which it is easier to operate, and this improves stability at high speeds.

2. Control Operation

Figure 14:
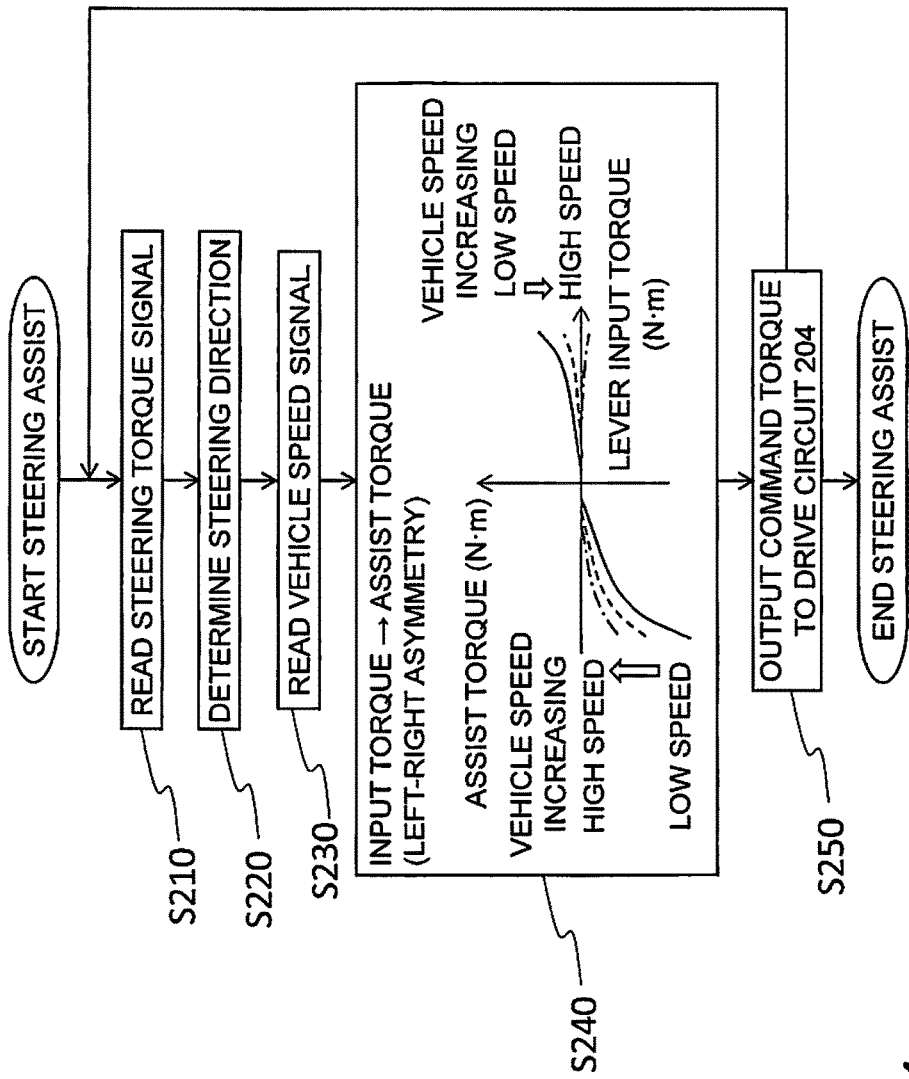
FIG. 14 is a flowchart of a method for controlling a wheel loader according to Embodiment 2 of the present invention.

FIG. 14 is a flowchart of the control operation performed by the force imparting component 27.

When the joystick lever 24 is operated, in step S210 the controller 28 acquires a steering torque signal from the torque sensor 103. The steering torque signal is a signal including information about the rotation direction and the magnitude of the torque produced by this rotation. For example, when the torque values include positive and negative values, a positive torque value indicates a torque value produced by right rotation, while a negative torque value indicates a torque value produced by left rotation.

Next, in step S220, the controller 28 determines the steering direction of the joystick lever 24 on the basis of the steering torque signal.

Next, in step S230, the controller 28 acquires a sensing value from the vehicle speed sensor 105.

Next, in step S240, the controller 28 determines the assist force on the basis of the stored assist torque information (the graph shown in FIG. 13).

The controller 28 stores the three sets of assist torque information shown in FIG. 13 (at vehicle speeds of 0 km/h, 25 km/h, and 40 km/h), and when the sensed value from the vehicle speed sensor 105 is between the three speeds, the assist torque at that speed is calculated by interpolation. Thus calculating the assist torque by interpolation allows the assist torque to be varied continuously according to the change in speed.

Next, in step S250, the controller 28 outputs a command torque from the drive circuit 204 on the basis of the decided assist force, the electric motor 111 is driven, and a force is imparted to the operation of the joystick lever 24 via the link 25.

Features, etc.

(1)

The wheel loader 1 pertaining to this embodiment (an example of a work vehicle) is an articulated type in which the front frame 11 and the rear frame 12 are linked, and comprises the joystick lever 24, the force imparting component 27, and the controller 28. The joystick lever 24 is moved to the inside or the outside with respect to the operator's seat 5*a* by operator operation to change the steering angle θs of the front frame 11 with respect to the rear frame 12. The force imparting component 27 imparts an assist force or counterforce to the operation of the joystick lever 24 by the operator. The controller 28 controls the force imparting component 27 so that the operating force required to move the joystick lever 24 to the outside is different from the operating force required to move the joystick lever 24 to the inside.

Thus imparting a force so that the operating force required to move the joystick lever 24 to the outside is different from the operating force required to move the joystick lever 24 to the inside allows the tactile sensation when the wrist is moved to the outside to be set to be about the same as the tactile sensation when the wrist is moved to the inside, so the tactile sensation of the operator can be improved.

(2)

With the wheel loader 1 in this embodiment, the controller 28 controls the force imparting component 27 so that the operating force required to move the joystick lever 24 to the outside is less than the operating force required to move the joystick lever 24 to the inside.

In general, it is harder to move the joystick lever 24 to the outside with respect to the operator's seat 5*a* than to move the joystick lever 24 to the inside. Accordingly, when a force is thus imparted so that the force required to move the joystick lever 24 to the outside is less than the operating force required to move the joystick lever 24 to the inside, the tactile sensation when the wrist is moved to the outside can be set to a tactile sensation that is about the same as that when the wrist is moved to the inside. This improves the tactile sensation of the operator.

Also, even when the joystick lever 24 is moved to the outside, it can be moved with a lighter force.

(3)

The wheel loader 1 in this embodiment further comprises the torque sensor 103 (an example of a torque sensor). The torque sensor 103 senses the torque produced by the operation of the joystick lever 24. The controller 28 controls the force imparting component so as to impart an assist force or counterforce to the operation of the joystick lever 24 according to the torque sensed by the torque sensor 103. Consequently, a force can be imparted according to the torque applied by the operator to the joystick lever. For example, the imparted force can be controlled so that the assist force imparted by the force imparting component 27 is increased when the torque applied to the joystick lever 24 by the operator is high, and the assist force is reduced when the torque is low.

(4)

With the wheel loader 1 in this embodiment, the torque sensor 103 (an example of a torque sensor) senses whether movement of the joystick lever 24 is to the inside or the outside. The controller 28 controls the force imparting component 27 so that the force imparted to operation of the joystick lever 24 is varied on the basis of the movement direction of the joystick lever 24, according to the torque sensed by the torque sensor 103.

Consequently, the controller 28 determines whether the joystick lever 24 is being operated to the inside or the outside with respect to the operator's seat 5*a*, and can control the force imparting component 27 so that the operating force required to move the joystick lever 24 to the outside is lower than the operating force required to move the joystick lever 24 to the inside.

(5)

The wheel loader 1 in this embodiment further comprises the vehicle speed sensor 105 (an example of a speed sensor). The vehicle speed sensor 105 (an example of a speed sensor) senses the speed of the wheel loader 1. The controller 28 controls the force imparting component so that an assist force or counterforce is imparted according to the speed sensed by the vehicle speed sensor 105.

Consequently, when the wheel loader 1 is moved at a low speed, for example, operability can be improved by imparting an assist force to the joystick lever 24 to reduce the force required to operate the joystick lever 24. On the other hand, when the travel speed of the wheel loader 1 is changed from a low speed to a high speed, travel stability can be improved by imparting a counterforce to the joystick lever 24 or decreasing the assist force to increase the force needed to operate the joystick lever 24.

(6)

With the wheel loader 1 in this embodiment, the controller 28 controls the force imparting component 27 so that when the speed sensed by the vehicle speed sensor 105 (an example of a speed sensor) is higher than a specific preset speed, a counterforce is imparted to at least movement of the joystick lever 24 to the inside, and when the speed sensed by the vehicle speed sensor 105 is equal to or lower than the specific preset speed, an assist force is imparted.

When the joystick lever 24 is moved in the inside direction of the operator's seat 5a, the operator can easily apply force. Therefore, when the joystick lever 24 is moved in the inside direction of the operator's seat 5a while the wheel loader 1 is moving at a high speed, a counterforce is imparted to the operation of the joystick lever 24, and this improves travel stability at high speed.

The predetermined speed here is a value at which the assist torque is switched by interpolation from an assist force to a counterforce, and in FIG. 13, for example, the predetermined speed is a value between 25 km/h and 40 km/h.

(7)

With the wheel loader 1 in this embodiment, the controller 28 controls the force imparting component 27 so that when an assist force is imparted to movement of the joystick lever 24 both to the inside and to the outside, the assist force when the joystick lever 24 is moved to the outside is greater than the assist force when the joystick lever 24 is moved to the inside.

By thus making the assist force when moving the joystick lever 24 to the outside be different from the assist force when moving the joystick lever 24 to the inside, the operating force required to move the joystick lever 24 to the outside can be lower than the operating force required to move the joystick lever 24 to the inside.

(8)

The wheel loader 1 in this embodiment comprises the steering cylinders 21 and 22 (an example of a hydraulic actuator) and the pilot valve 42 (an example of a control valve). The steering cylinders 21 and 22 change the steering angle θs. The pilot valve 42 is linked to the joystick lever 24 and controls the flow of fluid supplied to the steering cylinders 21 and 22. The pilot valve 42 has the operation input shaft 61 (an example of a first input member), the feedback input shaft 62 (an example of a second input member), and the first spring 64 and the second spring 65 (an example of biasing components). The operation input shaft 61 is linked to the joystick lever 24 and is displaced according to the amount by which the joystick lever 24 is operated. The feedback input shaft 62 is displaced according to the steering angle θs. The first spring 64 and the second spring 65 bias the operation input shaft 61 to go into the neutral position Np at which the rotational angle θin (an example of the amount of displacement) of the operation input shaft 61 matches the rotational angle θfb (=θs) (an example of the amount of displacement) of the feedback input shaft 62. The controller 28 controls the flow of fluid supplied to the steering cylinders 21 and 22 according to the difference between the rotational angle θin of the operation input shaft 61 and the rotational angle θfb of the feedback input shaft 62. The joystick lever 24 is operated against the biasing force of the first spring 64 and the second spring 65.

Consequently, after the joystick lever 24 has been operated, the actual steering angle θs changes to follow the target steering angle (corresponds to the rotational angle θin) produced by the joystick lever 24, and the pilot valve 42 goes into the neutral position when the actual steering angle matches the target steering angle.

Also, the first spring 64 and the second spring 65 are thus provided to the pilot valve 42, and the operator operates the joystick lever 24 with an operating force that goes against the biasing force produced by the first spring 64 and the second spring 65. An assist force or counterforce can be imparted to the operation against this biasing force.

(9)

The wheel loader 1 in this embodiment further comprises the steering valve 32. The steering valve 32 adjusts the flow of fluid supplied to the steering cylinders 21 and 22 on the basis of a pilot pressure inputted from the pilot valve 42. The pilot valve 42 controls the flow of fluid supplied from the steering valve 32 to the steering cylinders 21 and 22 by adjusting the pilot pressure. Consequently, the pilot pressure is adjusted by operator operation, the amount of fluid supplied from the steering valve 32 to the steering cylinders 21 and 22 is controlled, and the steering angle θs of the front frame with respect to the rear frame is changed.

(10)

The wheel loader 1 in this embodiment further comprises the steering cylinders 21 and 22, the pilot valve 42, and the link 25. The steering cylinders 21 and 22 change the steering angle θs. The pilot valve 42 is linked to the joystick lever 24 and controls the flow of fluid supplied to the steering cylinders 21 and 22. The link 25 links the joystick lever 24 to the pilot valve 42. The force imparting component 27 has the electric motor 111 and the worm gear 112 (an example of a transmission mechanism). The electric motor 111 generates the assist force or the counterforce. The worm gear 112 transmits the assist force or the counterforce produced by the electric motor 111 to the link 25.

Consequently, the force of the electric motor 111 can be transmitted to the link 25 that links the joystick lever 24 to the pilot valve 42, and the force required to operate the joystick lever 24 can be changed.

(11)

The method for controlling the wheel loader 1 in this embodiment is a method for controlling an articulated wheel loader in which the front frame 11 and the rear frame 12 are linked, said method comprising a step S120 (an example of a operation direction sensing step) and steps S130 and S140 (an example of a force imparting step). Step S120 (an example of an operation direction sensing step) involves sensing the rotation direction of the joystick lever 24 that is able to rotate to the right side (an example of to the inside with respect to the operator's seat) or to the left side (an example of to the outside with respect to the operator's seat). Steps S130 and S140 (an example of a force imparting step) involve imparting an assist force or a counterforce to the operation of the joystick lever 24 by the operator so that the operating force required when the joystick lever 24 is moved to the outside will be different from the operating force required when the joystick lever 24 is moved to the inside.

Thus imparting a force so that the operating force required to move the joystick lever to the outside will be different from the operating force required to move the joystick lever to the inside allows the tactile sensation when the wrist is moved to the outside to be set to a tactile sensation that is about the same as that when the wrist is moved to the inside, so the tactile sensation of the operator can be improved.

Other Embodiments

Embodiments of the present invention were described above, but the present invention is not limited to or by the above embodiments, and various modifications are possible without departing from the gist of the present invention.

(A)

In Embodiments 1 and 2 above, since the joystick lever 24 was disposed on the left side of the operator's seat 5a, movement of the joystick lever 24 to the right side corresponded to movement to the inside with respect to the operator's seat, and movement of the joystick lever 24 to the left side corresponded to movement to the outside with respect to the operator's seat, but the disposition of the joystick lever 24 is not limited to this. The joystick lever 24 may be disposed on the right side of the operator's seat 5a, in which case movement of the joystick lever 24 to the left side corresponds to movement to the inside with respect to the operator's seat, while movement of the joystick lever 24 to the right side corresponds to movement to the outside with respect to the operator's seat.

(B)

In Embodiments 1 and 2 above, the operation direction of the joystick lever 24 was also sensed by the torque sensor 103, but sensing of the operation direction may instead be performed on the basis of the angular difference between rotational angle θin sensed by the first rotational angle sensor 101 (an example of a target steering angle sensor) and the rotational angle θfb (=θs) sensed by the second rotational angle sensor 102 (an example of an actual steering angle sensor).

In this case, the values sensed by the first rotational angle sensor 101 and the second rotational angle sensor 102 are inputted to the controller 28, and the controller 28 calculates the body-lever angular deviation α. Then, in step S120 shown in FIG. 11, the steering direction of the joystick lever 24 is determined on the basis of the body-lever angular deviation α.

Also, instead of using the value sensed by the second rotational angle sensor 102, the body-lever angular deviation α may be calculated from the steering angle θs sensed by the steering angle sensor 104 and the rotational angle θin sensed by the first rotational angle sensor 101.

Furthermore, the body-lever angular deviation α may be calculated from the steering angle θs calculated from the values sensed by cylinder stroke sensors 106 and 107, and the rotational angle θin sensed by the first rotational angle sensor 101.

(C)

In Embodiments 1 and 2 above, the assist torque was decided according to the torque sensor value, but a torque sensor may not be provided, and control may be performed so that assist torque is imparted uniformly with respect to the operation direction of the joystick lever 24. More specifically, an assist torque of a predetermined constant value may be imparted regardless of the torque generated in response to the operation when the joystick lever 24 is operated to the right side, an assist torque of a predetermined constant value may be imparted regardless of the torque generated in response to the operation when the joystick lever 24 is operated to the left side, and the absolute value of the assist torque in operation to the left side may be made greater than the absolute value of the assist torque in operation to the right side.

Determination of whether movement of the joystick lever 24 is to the left side or to the right side can be accomplished on the basis of the angular difference between the first rotational angle sensor 101 and the second rotational angle sensor 102, as described above.

(D)

In Embodiment 2 above, a counterforce was imparted when the joystick lever 24 was operated to the right side in the high-speed travel, but this is not the only option, and an assist force that is weaker than when the operation is to the left side may be imparted. What is important is that the tactile sensation be improved when the operator operates the joystick lever 24 to the left and right.

(E)

In Embodiment 2 above, the controller 28 stored three sets of assist torque information, and the assist torque was varied continuously according to the speed by interpolation, but the assist torque information is not limited to three sets, and may consist of two sets or of four or more sets. When the assist torque is varied smoothly according to the speed, it is preferable to provide three or more sets.

(F)

In Embodiment 2 above, the controller 28 stored three sets of assist torque information, and the assist torque was varied continuously according to the speed by interpolation, but the assist torque may instead be varied in steps.

For example, the assist torque information at slow speed is indicated by the solid lines L11 and L12 in FIG. 13, the assist torque information at medium speed by the dotted lines L13 and L14 in FIG. 13, and the assist torque information at fast speed by the one-dot chain lines L5 and L16 in FIG. 13. A low speed, for example, is a speed of less than 15 km/h, a medium speed is 15 km/h or higher and less than 25 km/h, and a high speed is at least 25 km/h and no more than 40 km/hour. Also, for example, 15 km/h can be set as a first threshold, and 25 km/h as a second threshold (an example of a predetermined speed).

In a case such as this, when the joystick lever 24 is operated, the controller 28 compares the speed sensed by the vehicle speed sensor 105 to the first threshold and the second threshold, and determines whether the vehicle speed is slow, medium, or fast. The assist torque information for the determined speed is then used to decide the assist torque from the steering torque signal. The speed is not limited to three stages, and may instead be divided into just two stages or may be divided finer than three stages.

(G)

In Embodiments 1 and 2 above, the joystick lever 24 and the pilot valve 42 were mechanically linked by the link 25, but this is not the only option. The joystick lever 24 and the pilot valve may not be mechanically linked, and the operation of the joystick lever 24 may be transmitted electrically to the pilot valve, so that the pilot valve is operated in that way.

Figure 15:
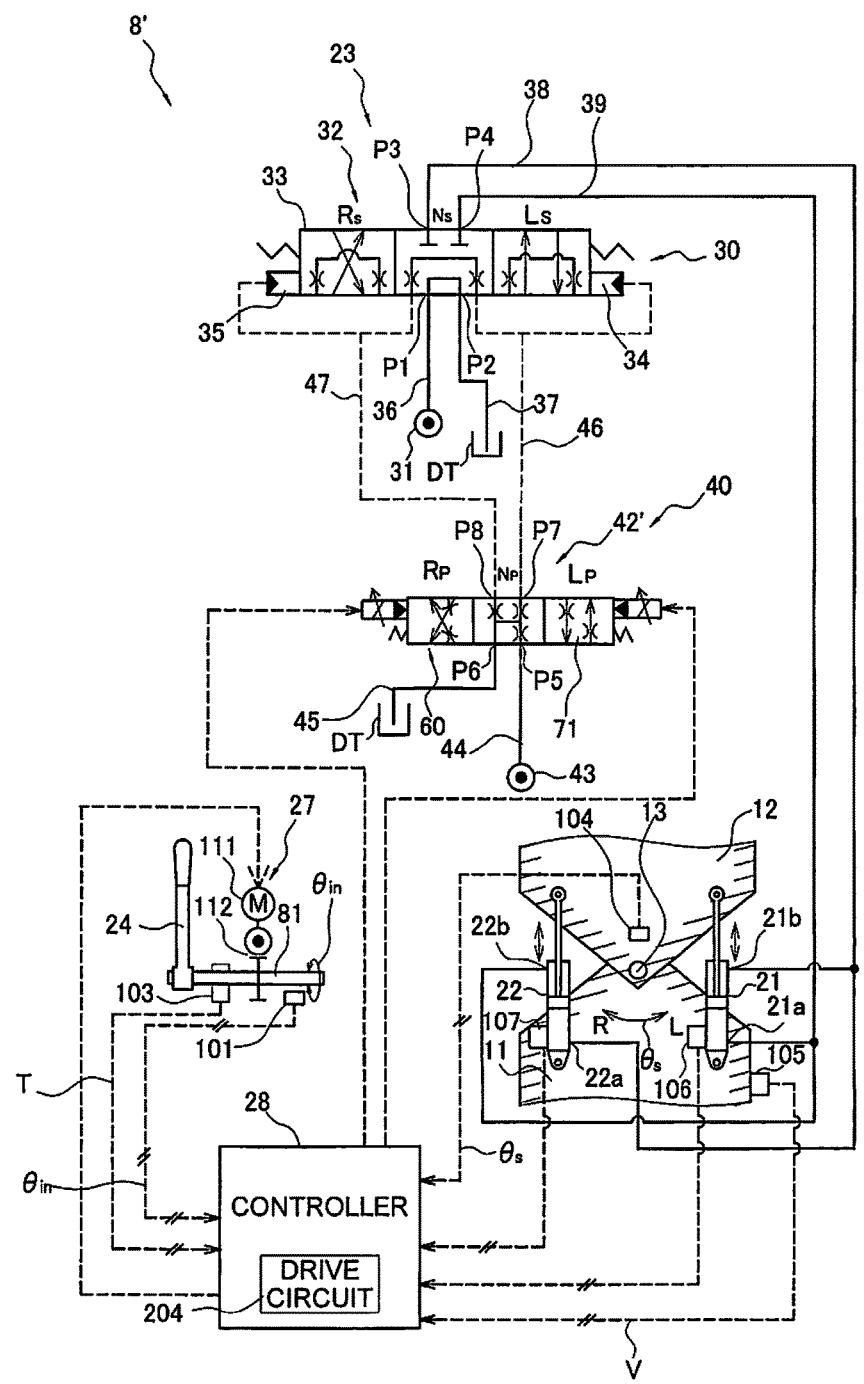
FIG. 15 is a configuration diagram showing a steering operation device in a modification example of an embodiment pertaining to the present invention.

FIG. 15 is a diagram showing a steering operation device 8' as an example of a configuration for electrically transmitting the operation of the joystick lever 24 to a pilot valve 42'. The pilot valve 42' shown in FIG. 15 is not a rotary type as in Embodiments 1 and 2, but rather a spool type. The pilot valve 42' has a valve body component 60 that includes a spool 71' and a sleeve (not shown). The spool 71' is able to move between a neutral position Np, a left pilot position Lp, and a right pilot position Rp according to a signal from the controller 28, and using the sleeve as a reference.

With the configuration shown in FIG. 15, for example, the universal joint 83 shown in FIG. 5 is not provided. The joystick lever 24 is connected to the steering operation shaft 81. The steering operation shaft 81 is not linked to the pilot valve. As in the above embodiment, the force imparting component 27 imparts an assist force or a counterforce to the steering operation shaft 81. The first rotational angle sensor 101 senses the rotational angle θin of the steering operation shaft 81 and transmits it to the controller 28.

Also, with the steering operation unit 8', the pilot valve 42' is a spool type. The linking mechanism 26 for linking the pilot valve and the front frame 11 as shown in FIG. 5 is not provided. The steering angle sensor 104 senses the steering angle θs of the front frame 11 with respect to the rear frame 12 and sends the steering angle θs to the controller 28.

The controller 28 sends a command to the pilot valve 42' and controls the movement of the spool 71' of the pilot valve 42' on the basis of the received information about the rotational angle θin and the steering angle θs. The movement of the spool 71' changes the pilot pressure supplied from the pilot valve 42' to the steering valve 32, and changes the amount of fluid supplied from the steering valve 32 to the steering cylinders 21 and 22. Consequently, a steering operation is performed. At this point, the controller 28 may control the pilot pressure so that the difference between θin and θs is reduced, thereby making the rotational angle θin match the steering angle θs.

Figure 16:
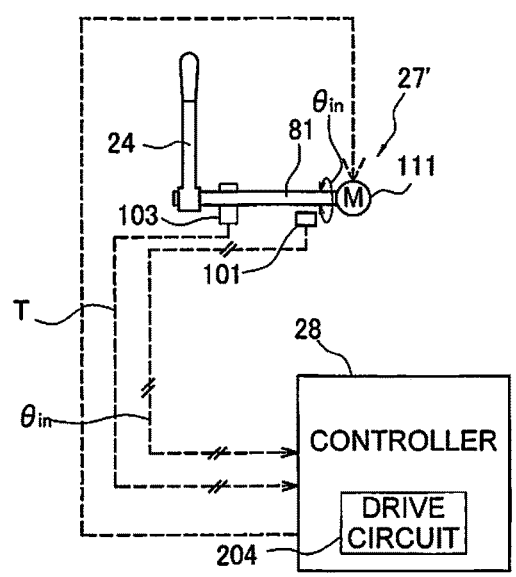
FIG. 16 is a configuration diagram showing a force imparting component in a modification example of an embodiment pertaining to the present invention.

With the steering operation device 8', the force of the electric motor 111 is transmitted by the worm gear 112 to the steering operation shaft 81, but as with the force imparting component 27' shown in FIG. 16, the rotational shaft of the electric motor 111 may be connected directly to the steering operation shaft 81, without going through a reduction gear such as the worm gear 112.

With the steering apparatus 8 shown in FIG. 5, the joystick lever 24 itself is able to rotate around the axis in the up and down direction, to the inside or the outside of the operator's seat. The configuration may be such that the joystick lever 24 itself is able to rotate horizontally around the shaft, to the inside or the outside of the operator's seat. In other words, the configuration may be such that the pilot valve 42' is actuated on the basis of operation of the joystick lever 24, and the force from the force imparting component 27 can be transmitted to the joystick lever 24.

Electrical transmission may be performed either by wire or wirelessly.

(H)

In Embodiments 1 and 2 above, a force was generated by the electric motor 111, but instead of an electric motor, a hydraulic motor or the like may be used. In other words, it should be an actuator or the like with which the force to be imparted can be generated.

(I)

In the above embodiments, the drive circuit 204 was included in the controller 28, but it need not be included in the controller 28, and only the drive circuit 204 may be mounted by itself. Furthermore, the drive circuit 204 may be mounted to an electric motor.

(J)

In Embodiments 1 and 2 above, the configuration was such that the amount of fluid supplied from the steering valve 32 to the steering cylinders 21 and 22 was controlled according to the pilot pressure inputted from the pilot valve 42 (an example of a control valve), but the configuration may instead be such that fluid from the pilot valve 42 is supplied directly to the steering cylinders 21 and 22.

(K)

In Embodiments 1 and 2 above, two springs, namely, the first spring 64 and the second spring 65, were provided, but the second spring 65 may be omitted. In this case, for example, the part between the feedback spool 73 and the feedback sleeve 74 should be fixed.

(L)

In Embodiments 1 and 2 above, the wheel loader 1 was given as an example of a work vehicle, but a wheel loader is not the only option, and may instead be an articulated dump truck, motor grader, or the like, so long as it is an articulated work vehicle.

INDUSTRIAL APPLICABILITY

The work vehicle and method for controlling a work vehicle of the present invention have the effect of allowing the tactile sensation experienced by the operator to be improved, and are useful in a wheel loader or the like.

The invention claimed is:

1. A work vehicle, the work vehicle being articulated with a front frame and a rear frame linked to the front frame, the work vehicle comprising:
   a joystick lever configured to be moved to an inside or an outside with respect to an operator's seat by being operated by an operator, to change a steering angle of the front frame with respect to the rear frame;
   a force imparting component configured to impart an assist force or a counterforce to an operation of the joystick lever by the operator; and
   a controller configured to control the force imparting component so that an operating force required to move the joystick lever to the outside is different from an operating force required to move the joystick lever to the inside.

2. The work vehicle according to claim 1, wherein
   the controller is further configured to control the force imparting component so that the operating force required to move the joystick lever to the outside is less than the operating force required to move the joystick lever to the inside.

3. The work vehicle according to claim 1, further comprising:
   a torque sensor configured to sense torque produced by operation of the joystick lever,
   the controller being further configured to control the force imparting component so that an assist force or a counterforce is imparted to the operation of the joystick lever according to torque sensed by the torque sensor.

4. The work vehicle according to claim 3, wherein
   the torque sensor is further configured to sense whether movement of the joystick lever is to the inside or the outside, and
   the controller is further configured to control the force imparting component so that the force imparted to operation of the joystick lever is varied based on movement direction of the joystick lever, according to the torque sensed by the torque sensor.

5. The work vehicle according to claim 1, further comprising:
   a target steering angle sensor; and
   an actual steering angle sensor,
   the joystick lever being rotatable to the inside or the outside with respect to the operator's seat,
   a rotational angle of the joystick lever corresponding to a target steering angle of the front frame with respect to the rear frame,
   the target steering angle sensor being configured to sense the target steering angle; and
   the actual steering angle sensor being configured to sense an actual steering angle, and
   the controller being further configured to determine whether movement of the joystick lever is to the inside or the outside based a difference between the target steering angle and the actual steering angle.

6. The work vehicle according to claim 1, further comprising:
   a speed sensor configured to sense a speed of the work vehicle, the controller being further configured to control the force imparting component so as to impart the assist force or the counterforce according to the speed sensed by the speed sensor.

7. The work vehicle according to claim 6, wherein the controller is further configured to control the force imparting component so that
when the speed sensed by the speed sensor is higher than a specific preset speed, the counterforce is imparted to at least movement of the joystick lever to the inside, and
when the speed sensed by the speed sensor is equal to or lower than the specific preset speed, the assist force is imparted.

8. The work vehicle according to claim 1, wherein the controller is further configured to control the force imparting component so that when the assist force is imparted to movement of the joystick lever both to the inside and to the outside, the assist force when the joystick lever is moved to the outside is greater than the assist force when the joystick lever is moved to the inside.

9. The work vehicle according to claim 1, further comprising:
a hydraulic actuator configured to change the steering angle; and
a control valve linked to the joystick lever and configured to control a flow of fluid supplied to the hydraulic actuator, the control valve including
a first input member linked to the joystick lever and configured to be displaced according to an amount of operation of the joystick lever;
a second input member configured to be displaced according to the steering angle; and
a biasing component biasing the first input member to a neutral position in which an amount of displacement of the first input member matches an amount of displacement of the second input member,
the controller being further configured to control the flow of fluid supplied to the hydraulic actuator according to a difference between the amount of displacement of the second input member and the amount of displacement of the first input member, and
the joystick lever being operated against a biasing force of the biasing component.

10. The work vehicle according to claim 9, further comprising:
a steering valve configured to adjust the flow of fluid supplied to the hydraulic actuator based on a pilot pressure inputted from the control valve,
the control valve being further configured to control the flow of fluid supplied from the steering valve to the hydraulic actuator by adjusting the pilot pressure.

11. The work vehicle according to claim 1, further comprising:
a hydraulic actuator configured to change the steering angle;
a control valve linked to the joystick lever and configured to control a flow of fluid supplied to the hydraulic actuator; and
a link linking the joystick lever to the control valve,
the force imparting component including
an electric motor configured to generate the assist force or the counterforce, and
a transmission mechanism configured to transmit the assist force or the counterforce produced by the electric motor to the link.

12. A method for controlling an articulated work vehicle with a front frame and a rear frame linked to the front frame, the method comprising:
sensing a rotation direction of a joystick lever that is rotatable to an inside or an outside with respect to an operator's seat; and
imparting an assist force or a counterforce to an operation of the joystick lever by an operator so that an operating force required when the joystick lever is moved to the outside will be different from an operating force required when the joystick lever is moved to the inside.

* * * * *